(12) United States Patent
Piszczek et al.

(10) Patent No.: US 8,751,836 B1
(45) Date of Patent: Jun. 10, 2014

(54) DATA STORAGE SYSTEM AND METHOD FOR MONITORING AND CONTROLLING THE POWER BUDGET IN A DRIVE ENCLOSURE HOUSING DATA STORAGE DEVICES

(75) Inventors: Michael J. Piszczek, Laurel, MD (US); Manjari Mishra, Elkridge, MD (US); William Joseph Harker, Columbia, MD (US); Andrew Pershall, Severna Park, MD (US); David F. Fellinger, Westlake Village, CA (US)

(73) Assignee: DataDirect Networks, Inc., Chatsworth, TX (US)

( * ) Notice: Subject to any disclaimer, the term of this patent is extended or adjusted under 35 U.S.C. 154(b) by 216 days.

(21) Appl. No.: 13/338,631

(22) Filed: Dec. 28, 2011

(51) Int. Cl.
  *G06F 1/26* (2006.01)
(52) U.S. Cl.
  USPC ............................ 713/300; 713/310; 713/320
(58) Field of Classification Search
  USPC ......................................... 713/300, 310, 320
  See application file for complete search history.

(56) References Cited

U.S. PATENT DOCUMENTS

| | | | |
|---|---|---|---|
| 7,996,612 B2 * | 8/2011 | Ukai et al. ..................... 711/114 |
| 2007/0016811 A1 * | 1/2007 | Suzuki et al. ................. 713/300 |
| 2007/0208963 A1 * | 9/2007 | Shinto ........................... 713/500 |
| 2008/0204920 A1 * | 8/2008 | Muramatsu et al. ............ 360/71 |
| 2008/0228959 A1 * | 9/2008 | Wang ............................... 710/22 |
| 2010/0070789 A1 * | 3/2010 | Hori et al. ...................... 713/324 |
| 2010/0325461 A1 * | 12/2010 | Sakagami ...................... 713/324 |
| 2011/0029787 A1 * | 2/2011 | Day et al. ....................... 713/300 |
| 2011/0029793 A1 * | 2/2011 | Horvath et al. ............... 713/320 |
| 2011/0307728 A1 * | 12/2011 | Hatasaki et al. .............. 713/323 |
| 2011/0320796 A1 * | 12/2011 | DeCusatis et al. ................ 713/2 |
| 2012/0137143 A1 * | 5/2012 | Tsuyuki ......................... 713/300 |
| 2012/0233452 A1 * | 9/2012 | Andresen et al. .................. 713/2 |
| 2013/0047030 A1 * | 2/2013 | Soeda et al. ..................... 714/14 |

\* cited by examiner

*Primary Examiner* — Kim Huynh
*Assistant Examiner* — Zahid Choudhury
(74) *Attorney, Agent, or Firm* — Rosenberg, Klein & Lee

(57) ABSTRACT

A control processor manages the power budget in a drive enclosure and is within the drive enclosure which monitors in real time a redundantly configured power supply unit, drives, interposers, and temperature sensors, and determines the power settings for each drive to avoid overload and overheating in the system. The control processor dynamically adjusts the mode of operation as needed during operation through the SAS interposer. A localized monitoring and control mechanism eliminates the need for extraneous coordination of information across various entities that access the storage. Data tunneling takes place directly between the compute nodes and target drives through the SAS expander and interposer, and does not need buffering the pending IO requests in the DRAM.

22 Claims, 16 Drawing Sheets

DATA STORAGE SYSTEM AND METHOD FOR MONITORING AND CONTROLLING THE POWER BUDGET IN A DRIVE ENCLOSURE HOUSING DATA STORAGE DEVICES

FIELD OF THE INVENTION

The present invention is directed to a data storage system provided with a power consumption monitoring and control mechanism to efficiently address power budget management requirements.

In general, the present invention is directed to a data storage system implemented with a plurality of data storage devices incorporated in a drive enclosure which are accessed by compute nodes for data IO (Input-Output) activity. The power budget of the drive enclosure is controlled by a control processor operating within the drive enclosure which in real-time monitors the components of the drive enclosure and dynamically adjusts the power settings of the data storage devices.

In particular, the present invention is directed to a data storage system where the power budget of a drive enclosure is controlled internally without the need for coordination with compute nodes activity which access the data storage system with IO requests, where the control processor is housed within the drive enclosure and is configured to monitor and dynamically adjust power modes (power settings) of drives (data storage devices) based on predetermined conditions concerning the power budget, the IO load of the data storage devices, the state of the power supplies, and the environmental conditions inside the drive enclosure.

In addition, the present invention is directed to a data storage system in which compute nodes are permitted to directly access the data storage devices through the SAS infrastructure of the drive enclosure, thus overcoming the "bottle neck" in data transmission due to data transmission through the enclosure CPU and the DRAM requiring buffering of the IO requests pending in the system.

The present invention is further directed to a data storage system in which a control processor within the drive enclosure in real-time supervises the power usage of each drive, the power input and output levels of power supplies, and the temperature of the various components in the drive enclosure, thus avoiding the need to precisely profile the power usage of each drive under various IO load conditions before it is installed in the system.

The present invention is further directed to a data storage system applicable both to the rotating disk drives and flash (solid-state) storage devices which are incorporated in the drive enclosure in which the power load of the drive enclosure is logically divided between a plurality of low wattage redundant power supplies. Each of the low wattage redundant power supplies operates under a budgeted maximum, where the enclosure control processor communicates with the monitoring logic in each low wattage power supply, temperature sensors in the enclosure, an interposer for each drive, as well as with each drive, in order to obtain in real time the temperature profile for each drive, and to dynamically adjust the power settings, as needed, during the operation through the SAS interface via a respective interposer.

In addition, the present invention is directed to a data storage system incorporated in a drive enclosure where power settings of the spinning regime (for disk drives) are dynamically adjusted, when needed, to meet the power budget requirements and to limit the power consumption, and where the IO throttling is used to control the power consumption to maintain optimal performance during read/write operations in the flash (solid-state) drives.

BACKGROUND OF THE INVENTION

Complex data storage systems with fully populated drive enclosures housing dynamic massive array of drives sometimes experience periods of unwanted excessive power consumption and elevated heat generation. Heat generated as a result of a large power consumption may cause increased drive failure rates, while excessive power consumption may lead to excessive operation costs and unwanted overload.

In order to prevent severe crashes due to excessive heating, a sufficient cooling regime has to be provided within the data storage system resulting in high electrical expenses driving up the operation costs.

By limiting the power consumption of storage devices for IO activity, the operational cost of the system may be significantly reduced and the life span of the data storage drives may be extended. Additionally, by reducing the power consumption in data storage systems, eco-friendly high performance computations may be attained in addition to reduction in the operational costs.

A significant amount of power savings may be achieved in data storage systems through using of staggered spinning up of the drives during "cold" boot, as well as by selective spinning up or down of drives during normal system operation. In order to achieve these objectives, a computer system extraneous to a drive enclosure is provided with the capability of controlling the spinning up or down of drives populating the drive enclosure. To provide for a quick disaster recovery, redundancy of such computer systems (or controllers) is normally introduced. An additional software entity is implemented to support the redundancy scheme which synchronizes and coordinates the activities of the computer systems accessing the same data storage device. For such software to successfully support the system operation, precise power requirements of the storage system are needed in advance.

"Green" drives have been used in contemporary storage systems that consume a moderate amount of power due to their relatively slow rotation, thus requiring lesser cooling. These drives have the capability of switching themselves into a low power mode after a certain period of inactivity. "Green" drives also permit the consumer system accessing the data storage to selectively spin up and down the disk drives. Unfortunately, high power consumption during "cold" start of the system due to a large amount of current drawn by the drives for spinning up results in elevated heat generation.

Referring to FIG. 1, in a cloud computing domain 10, several hosts or client computers (also referred to herein as compute nodes) 12 access a target storage which may be implemented as a drive enclosure 14 populated by a plurality of data storage devices 16, such as disk (rotating media) drives and/or flash (solid-state) storage, which combinably are referred to herein as drives.

In the state-of-the-art systems, the power requirements for the drives 16 must be accurately profiled and coordinated between the compute nodes 12 accessing the drive enclosure 14, which also may be referred to as a JBOD (Just Bunch of Disks) enclosure. This requires a Power Requirement Software 20 to run on the host side or on the controller (in the computing cloud) to coordinate and manage this information for the entire storage system. Alternatively, costly hardware is required which involves SAS (Serial Attached SCSI) interface and DRAM (Dynamic Random-Access Memory) to buffer the host data (I/O requests) before transferring to the drives by the controller.

The task becomes even more challenging in case of Virtual Machine environment where the information cannot be shared between different applications running on different guest operating systems where different controllers try to access the same storage device. In this situation, it is extremely difficult to coordinate information about the target storage device and this results in less than optimal power management.

Therefore, it would be highly desirable to eliminate the involvement of extraneous compute nodes (or applications) accessing the JBOD storage in the process of power management and control in the drive enclosure operation.

It also would be desirable to attain an efficient power management approach for the drive enclosure system which does not require prior knowledge of the system power requirements, i.e. precise profile of the power usage by drives under various IO conditions prior to the installation in the system.

The system shown in FIG. 1 is designed with two IO modules 18 provided within the drive disclosure 14 for redundancy purposes. Each IO module 18 includes SAS adapters 20, 22 with a corresponding PCI-e interface 24, 26, respectively, to the enclosure Central Processor Unit (CPU) 28 for connections from the host computers 12. Each CPU 28 uses a DRAM 30 for IO transfers.

The data (IO) requests 32 from respective client/compute nodes 12 (through the computing cloud 10) tunnel through the SAS port 34 of the drive enclosure 14, and the SAS adapter 20, as well as across the PCIe bus 24 to the Enclosure CPU 28, and subsequently to the DRAM 30. Once the data in question is recorded in the DRAM 30, the Enclosure CPU 28 starts sending the data from the DRAM 30 across the PCIe bus 26 to the SAS port 22. The data is further passed through the SAS expander 36 to the drives 16 via paths 38. The IO (request) is sent to the drives 16 through an SAS interface, also referred to herein as an Interposer 40. Each interposer is connected between the SAS expander 36 and the respective drive 16 housed in the enclosure 14.

The IO modules 18 are connected to each other via a dual communication channel 42 to coordinate the system management information concerning the power requirements of the system, temperature of the drives, and the information about the cooling elements.

Unfortunately, in this type of arrangement, the data (IO) transfer path through the SAS port 22, CPU 28, and the DRAM 30 creates a "bottle neck" which may undesirably slow the data tunneling through the system and may require the DRAM to buffer all of the IO in the drive enclosure. It would be highly desirable, therefore, to eliminate the need for buffering IO requests in data transmission.

As shown in FIG. 1, the prior art drive enclosure 14 uses two redundant large wattage power supplies 46 each of which is sized to meet the entire power load requirement of the system. This arrangement is defective from an efficiency standpoint.

SUMMARY OF THE INVENTION

It is therefore an object of the present invention to provide an efficient power management mechanism for a data storage system implemented in a drive enclosure through real-time monitoring and control of power consumption of the storage devices exclusively within the drive enclosure.

It is another object of the present invention to provide a data storage system implemented in a drive enclosure where a plurality of client/compute nodes access the interposers of target storage devices directly through the SAS expander of the drive enclosure. This avoids the data passage through SAS ports, CPU and the DRAM of the drive enclosure, thereby eliminating the need for buffering the IO data in the drive enclosure.

It is a further object of the present invention to provide a system and method for controlling the power budget in the drive enclosure in a localized manner (without involvement of extraneous compute nodes accessing the storage devices) by housing a power control system within the drive enclosure that is configured to supervise, in real time, the loading power levels of the drives by directly monitoring the power usage of each drive, the input and output levels of the power supplies, and the temperature of the various enclosure components, and based on the acquired information, to dynamically adjust the power modes of drives, whether they be spinning media disk drives or flash drives.

It is another object of the present invention to provide an efficient use of the budgeted power for the drive enclosure where the power load of the system is divided between several redundant low wattage power supplies arranged in the drive enclosure so that each low wattage redundant power supply provides a portion of the power load, i.e. the power load of the drive enclosure is shared between the redundant low wattage power supplies. With several low wattage power supplies, one of the redundant low wattage power supplies, for example, may be used to power those drives with active IO, while additional power supply(ies) may be used for those drives that are not performing IO or are spinning up.

In the event of one of the enclosure power supplies failure, the idle and spinning up drives may be turned off to assure that the remaining enclosure power supplies are not overloaded.

It is a further object of the present invention to provide a drive enclosure with several (at least two) redundant power supplies thus attaining the most efficient use of redundant power supplies for optimal load balances which may be achieved when the main power supply is used to power up the drive enclosure while the redundant power supplies may be used to supply power to spin up additional drives during periods of higher host activity which consumes more power during certain time intervals.

In addition, it is an object of the present invention to provide a data storage system with redundant power supplies arrangement where if one power supply fails during a normal operation, a redundant power supply may be used while the enclosure CPU prioritizes the spinning down of disk drives and/or placing the drives in lower power modes, or in case of the flash storage device, throttling the IO activity to the flash drive, in order to minimize the power consumption during the IO operation.

It is another object of the present invention to provide a data storage system where the temperature conditions within the drive enclosure are monitored by a specifically configured control processor preferably residing on the enclosure CPU which is able to communicate with the monitoring logic in power supplies, temperature sensors within the drive enclosure, and the interposer for each drive, as well as with each drive to dynamically adjust the drives' power settings, as needed during operation.

It is a further object of the present invention to provide a data storage system in which the IO operations are carried out through the interposers which are provided with means to monitor the power status of power supplies in the drive enclosure and to control the power supplied to the drives in accordance with the power supply's status. In the event of a power supply failure, the idle and spinning up drives may be turned off to prevent remaining enclosure power supplies from overloading. In this situation, the interposer reschedules the IO operations within the enclosure CPU to permit the active drives to remain active.

The present invention, in one aspect, represents a data storage system with effective power budget control which includes:

a plurality of data storage devices which may be implemented as disk drivers as well as solid-state (flash) drives, a drive enclosure populated with the data storage devices, a power supply unit configured with a plurality of redundant power supplies positioned in the drive enclosure and cumulatively providing a power load for the system sufficient to support the system operation, and a control processor positioned in the drive enclosure in operative connection with the data storage devices and redundant power supplies and configured to monitor in real-time power available from the power supplies, temperature conditions within the drive enclosure, as well as interposers data and drives operation. The control processor adjusts the mode of operation of the drives in accordance with the acquired information.

The power load required for the operation of the subject drive enclosure is divided between redundant low wattage power supplies in the power supply unit where each of them operates under a budgeted maximum. The control processor is configured with logic and circuitry permitting the drive enclosure to use the power equivalent (or lower) of a single power supply for disks with active IO, and can use an additional power supplies for drives that are not performing IO activity or which spin up. The power supplies are monitored by interposers to control the mode of operation of the drives of interest.

Each redundant power supply contains logic to monitor the AC input. If the control processor detects that an AC input voltage is below an acceptable level, then the control processor switches the drives into a lower mode until AC power is fully restored. If the control processor detects fluctuations in the AC power, then the drives are switched into a low power mode until the AC power stabilizes.

The control processor monitors the temperature voltage and current output of each power supply to determine each power supply's load and, based on a maximum power information obtained on the boot-up of the system, determines the loading condition of each power supply. In case of overloading of at least one of the power supplies, the control processor adjusts the power settings of the drives to reduce the power loading of the system.

The drive enclosure includes an IO (Input-Output) port, a Central Processor Unit (CPU), an expander operatively coupled between the IO port and the CPU, and a plurality of interposers. Each interposer is operatively coupled between the expander and a respective one of the plurality of data storage devices. The CPU controls data IO operations in the drive enclosure for tunneling data between the IO port and a respective data storage device upon receiving an IO request from at least one compute node extraneous to the drive enclosure.

A data tunneling path is created between the requesting compute node and the respective target data storage device (drive). The data path is composed of the expander coupled directly to the IO port and the interposer coupled directly to the expander.

The control processor may be operatively coupled between the CPU and the interposer. Alternatively, the control processor may be embedded in the CPU.

The drive enclosure has redundant architecture which includes at least first and a second IO modules, with each of the IO modules comprising the CPU, the expander, and the control processor. The CPUs of the IO modules are bi-directionally coupled to exchange therebetween information regarding power requirements, temperature conditions of different enclosure components, drives power situations, and interposers' information.

Each interposer represents an SAS infrastructure between the SAS expander and the drive and has logic to monitor the power consumed by the drive connected thereto. The control processor uses this information to determine the load of the drive, and in this way the load of the entire system may be accurately determined.

The interposers are configured to monitor a power status line which is the logical AND of status of all redundant power supplies in the drive enclosure. The interposer controls the operation of a power FET of a respective drive in accordance with the power line status in order to control supply of power to a drive in question.

In the event of a power supply failure, the interposer turns off the idle or spinning up drives to prevent overloading of remaining redundant power supplies and reschedules the IO operations through contact with the enclosure CPU. In the case of a flash drive, the interposer activates the Native Command Queue (NCQ) to throttle the IO activity to the flash drive in question to reduce its power consumption.

The control processor is configured to program the interposer with power limits that the interposer may use while it monitors the power consumption of the flash drive in real time. In this manner the interposer can restrict the power consumption to an acceptable level by throttling the IO activity. The control processor adjusts the settings of the interposers dynamically as the power load in the drive enclosure changes.

The subject system includes temperature sensors and fans disposed internally in the drive enclosure. Once the control processor detects that the temperature in the drive enclosure or of a monitored component is high, it increases the fan speed and switches the drives into a low power mode. In the case of overheating of a singular drive, this particular drive may be individually switched into a low power mode.

The present invention further constitutes a method of monitoring and controlling power budget in a data storage system which includes the steps of:

incorporating a control processor in a drive enclosure which includes a plurality of data storage devices, a Central Processor Unit (CPU), an expander operatively coupled to the CPU, and a plurality of interposers, each operatively coupled between the expander and a respective data storage device, providing a plurality of redundant low wattage power supplies in the drive enclosure where the redundant power supplies cumulatively provide power load for the drive enclosure operation, operatively coupling the control processor to the CPU, interposers, data storage devices (drives), temperature sensors and fans within the drive enclosure, and each of the redundant power supplies, monitoring, in real time, the status and load of the redundant power supplies and load of the data storage devices, as well as temperature conditions within the drive enclosure, and adjusting, in real time, a mode of operation of the data storage devices in accordance with the information obtained during the monitoring procedure.

The mode of operation of the data storage device is adjusted to a lower power mode if an elevated temperature condition has been detected in the drive enclosure to limit power consumption and, as a result, reduces heat generation.

The control processor may additionally activate the speeding up of fans in an overheat situation.

Upon receiving an IO request from at least one compute node, the CPU passes data through a path composed of the enclosure expander and at least one interposer coupled directly to the expander and to the respective data storage device.

The subject method is further carried out through the steps of:

monitoring, by said at least one interposer, power status of each of the redundant power supplies, and in the event one power supply fails, turning off idle and spinning up data storage devices, rescheduling IO activity, and switching active data storage devices to a remaining "healthy" redundant power supply.

During a monitoring cycle, the subject method is also designed for: dynamically programming the interposer, by the control processor, with an acceptable power level available for the interposer, and in the power mode adjusting cycle, throttling by the interposer, the IO activity to a data storage device to restrict power consumption to an acceptable power level if the data storage device in question is a solid-state drive, and spinning down the data storage device if it is a rotating media drive.

If an AC input voltage of at least one of the redundant power supplies is detected below an acceptable voltage level, the subject method carries out the steps of:

switching data storage devices into a low power mode until the AC power is fully restored, and if fluctuations are detected in the AC power voltage, switching the plurality of data storage devices in a low power mode until the AC power stabilizes.

An additional provision of the subject method is carried out through the steps of:

monitoring via the interposer, power consumed by a data storage device, and determining via the control processor, a load of the data storage device in question based on the consumed power information received from the interposer, calculating a load in the drive enclosure, based on the load of the data storage device, and aborting the spinning up operation of the data storage device if an overload condition is determined.

These and other objects of the present invention will be more apparent when taken in conjunction with the drawings and detailed description of the preferred embodiment.

DETAILED DESCRIPTION OF THE PREFERRED EMBODIMENTS

Figure 1:
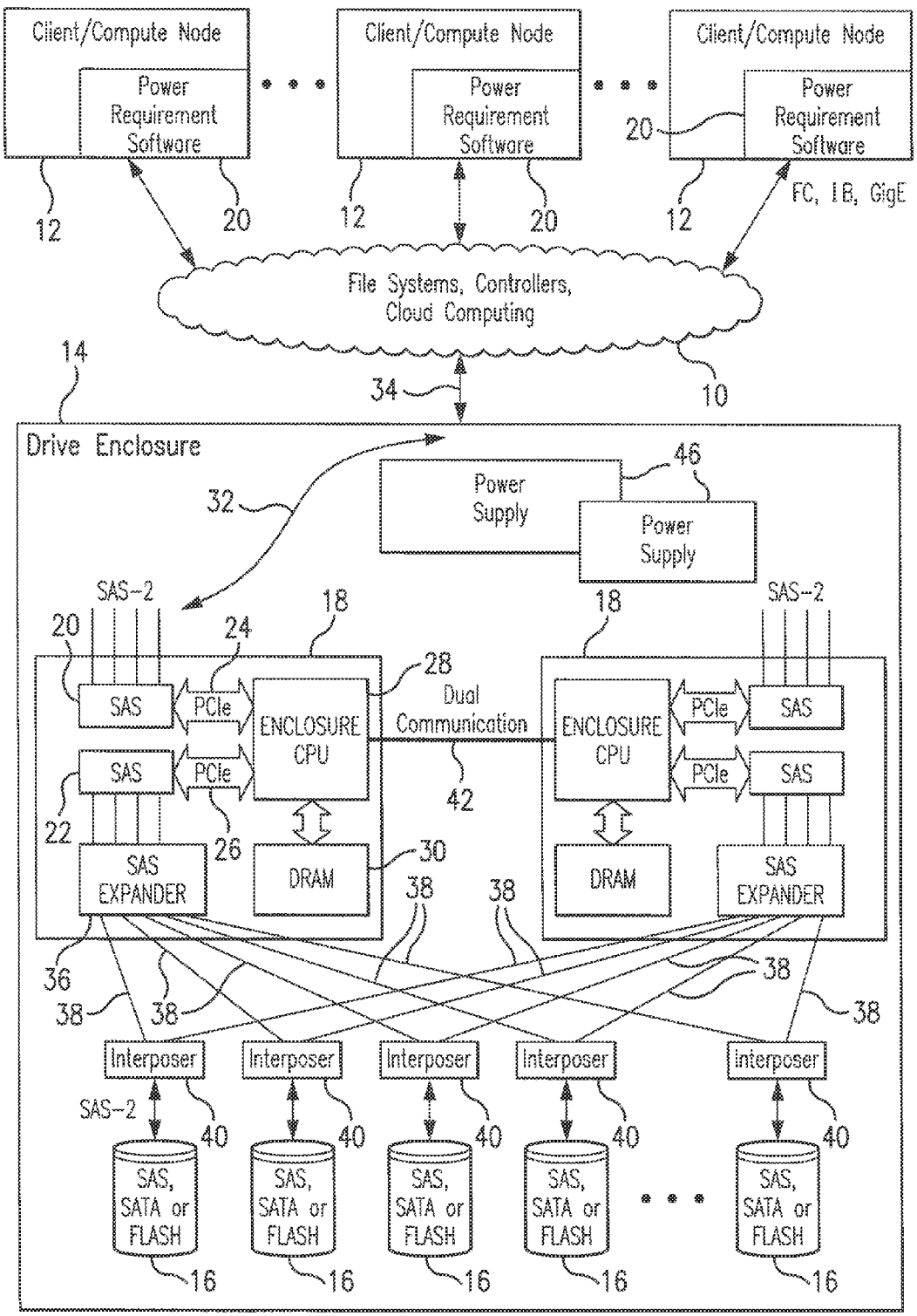
FIG. 1 is a schematic block diagram of a conventional prior art data storage system.
Figure 2:
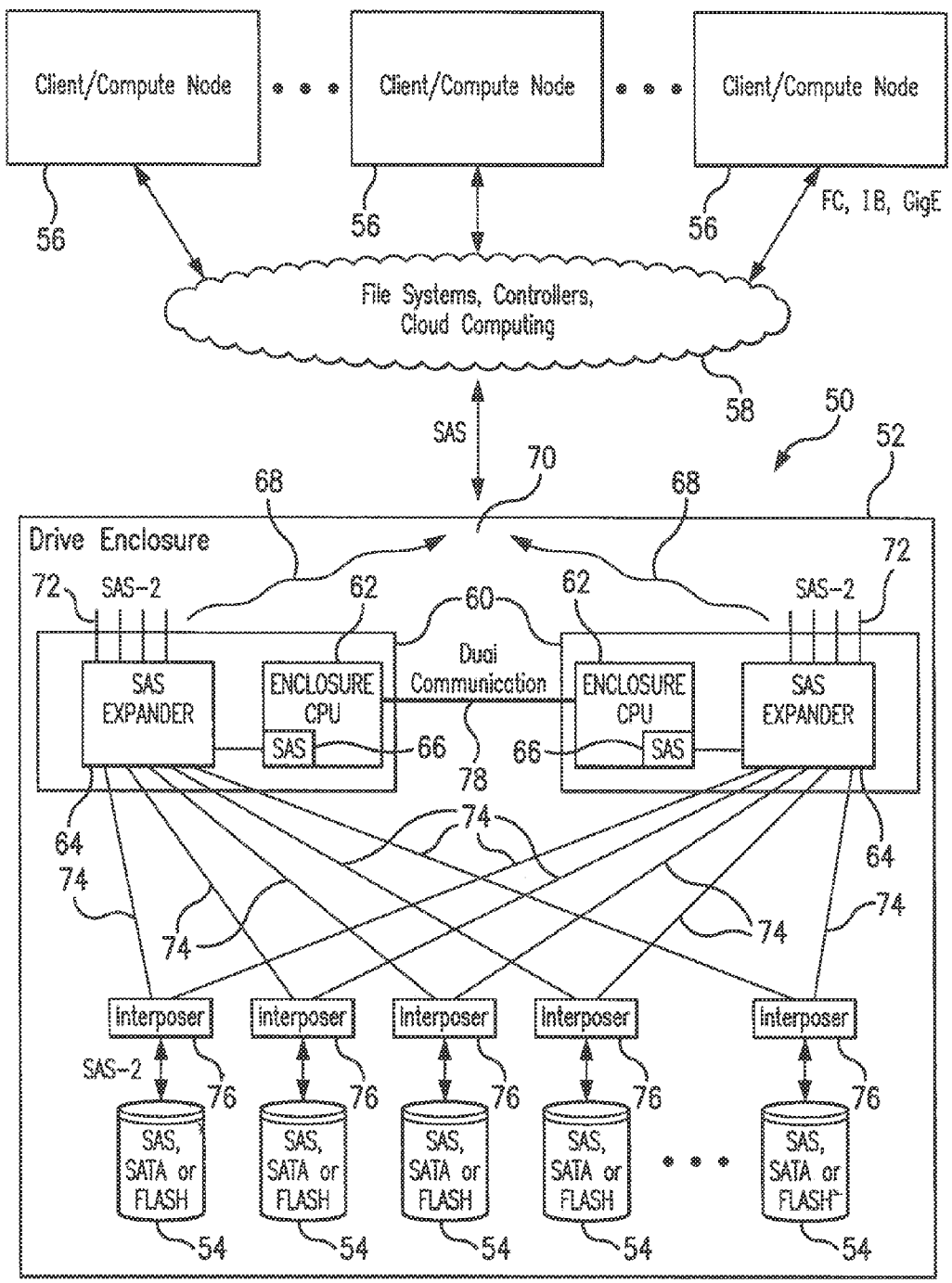
FIG. 2 is a block diagram of the data storage system of the present invention showing IO passing directly through the SAS expander to the interposer and further to the drives without involvement of the DRAM.

Referring to FIG. 2, system 50 of the present invention constitutes a data storage system implemented in a drive enclosure 52 which incorporates a plurality of data storage devices 54 which may be in the form of disk drives as well as flash drives. The drive enclosure 52 is built with components for supporting IO operation between client/compute nodes 56 and target storage devices 54 through the computing cloud 58.

As shown in FIG. 2, the drive enclosure 52 is built with redundant (for example two) IO modules 60. Each IO module 60 includes an enclosure CPU 62 connected to the SAS expander 64 over the SAS PHY interface 66. In the present system 50, all IO transmissions are carried out directly to the target drives 54 without passing through the DRAM of the enclosure CPU. Specifically, data 68 (for example, IO request) received from the client/compute nodes 56 at the SAS port 70 of the drive enclosure 52 is connected to the IO module 60 through SAS-2 interface 72 to the SAS extender 64 which internally connects to the drive expander modules (DEMS) (not shown in FIG. 2).

The data further is transmitted through channels 74 to the storage drives 54 via interposers 76 described in detail in further paragraphs.

The IO modules 60 are interconnected each to the other through a bi-directional communication channel 78 to share and coordinate the system management information including the information relating to the power requirements of the system, temperature of the drives, information about cooling elements, as well as information about environmental parameters within the drive enclosure 52.

Figure 3:
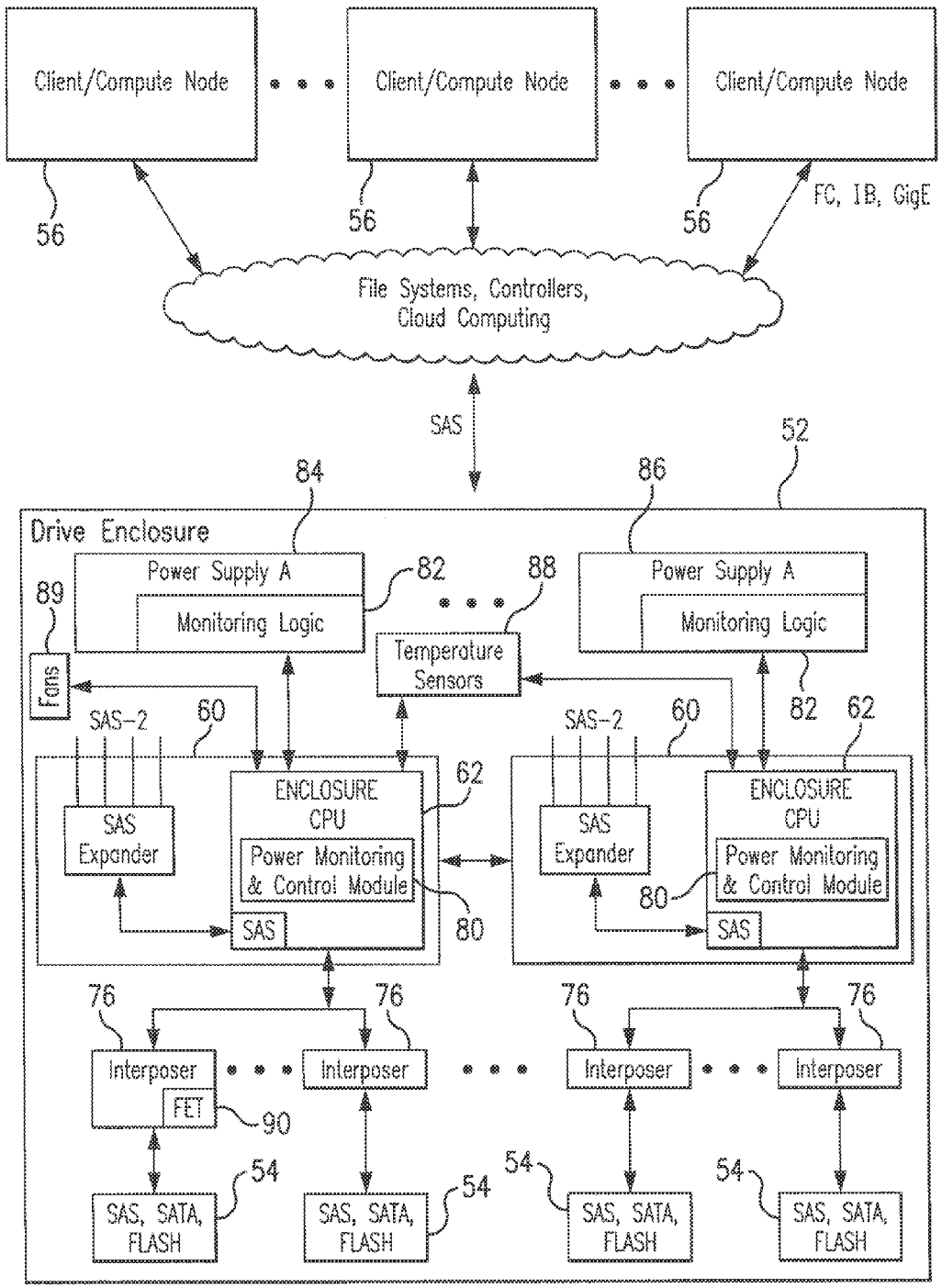
FIG. 3 is a block diagram of the data storage system of the present invention showing a power monitoring and control mechanism of the present invention implemented within the drive enclosure.

FIG. 3, representing the subject data storage system 50, illustrates the details of the real-time monitoring of the power consumption, generated heat, available power level, and control scheme for dynamically adjusting power modes of operation of the drives in order to meet power budget requirements. In order to perform these functions, the drive enclosure 52 is provided with an internal power monitoring and control module 80, also referred to herein as a control processor, which for example may be implemented as logic residing on the enclosure CPU 62.

Due to implementation of the power monitoring and control module 80 as an internal component of the drive enclosure 52, a localized monitoring and control mechanism is provided in the subject system which eliminates the need for extraneous software components to coordinate information across various entities that access the storage such as client/compute nodes 56.

One of the functions of the control processor 80 is to monitor power consumption and heat level of all of the components in the drive enclosure 52, and to determine if the power settings of the drives 54 are to be changed to avoid power overload and excessive temperature levels in the drive enclosure.

The control processor 80 communicates with monitoring logic 82 in the power supply(s) 84 and 86, the temperature sensors 88 and fans 89 installed within the drive enclosure 52, the interposer 76 of each drive 54, as well as directly with each drive 54. The power monitoring control module 80 determines the power setting of each drive 54 during the discovery process through the interposers 76. Based on the information obtained during the monitoring operation, the control processor 80 may dynamically adjust the power settings of the drives 54 if needed during operation through the SAS interface via the interposers 76.

The control processor 80 may adjust the power settings of the disks, i.e. spinning media drivers to limit their power consumption. In the case of the flash drives, IO throttling may be used to control the amount of power consumed while maintaining optimal performance during read/write operations.

The flash drives use insignificant power when idle. The read operations use some power but the write operations use significantly more power than the read operations. In the subject system, the IO requests to the flash drive may be throttled in order to minimize the power consumption during the IO operations.

The present data storage system 50 makes use of several low wattage power supplies in the drive enclosure, i.e. employs redundant low wattage power sources. The power load in the drive enclosure 52 is shared between the redundant low wattage power supplies. Each redundant power supply operates under a budgeted maximum power level. In contrast to state-of-the-art JBOD systems which usually use two large wattage power supplies, each of which is sized to power the operation of the entire system, while the drive enclosure can effectively use only one of the power supplies, in the subject systems, operation of the drive enclosure may be flexibly powered by as many low wattage power supplies, as needed, in a power sharing fashion.

As shown in FIG. 3, the power load of the driving enclosure is shared between several redundant low wattage power supplies, for example power supplies 84 and 86. Although only two redundant power supplies are shown in FIG. 3, it is contemplated that any number of redundant low wattage power supplies may be used in the subject system.

It is contemplated that the subject drive enclosure 52 with redundant power supplies 84, 86 uses less than the cumulative maximum power load of all of the supplies to prevent an overload in the event of one power supply failure. For example, if a pair of power supplies is provided in the drive enclosure 64, then less than an equivalent maximum of power load of one supply is used in case of a failure of another power supply.

The operation of the present system is supported by circuitry and logic which permits the drive enclosure to use the power equivalent to a single power supply out of all redundant power supplies for disks with active IO state while using the additional power from redundant power supplies for drives that are not performing IO or are spinning up.

Figure 5:
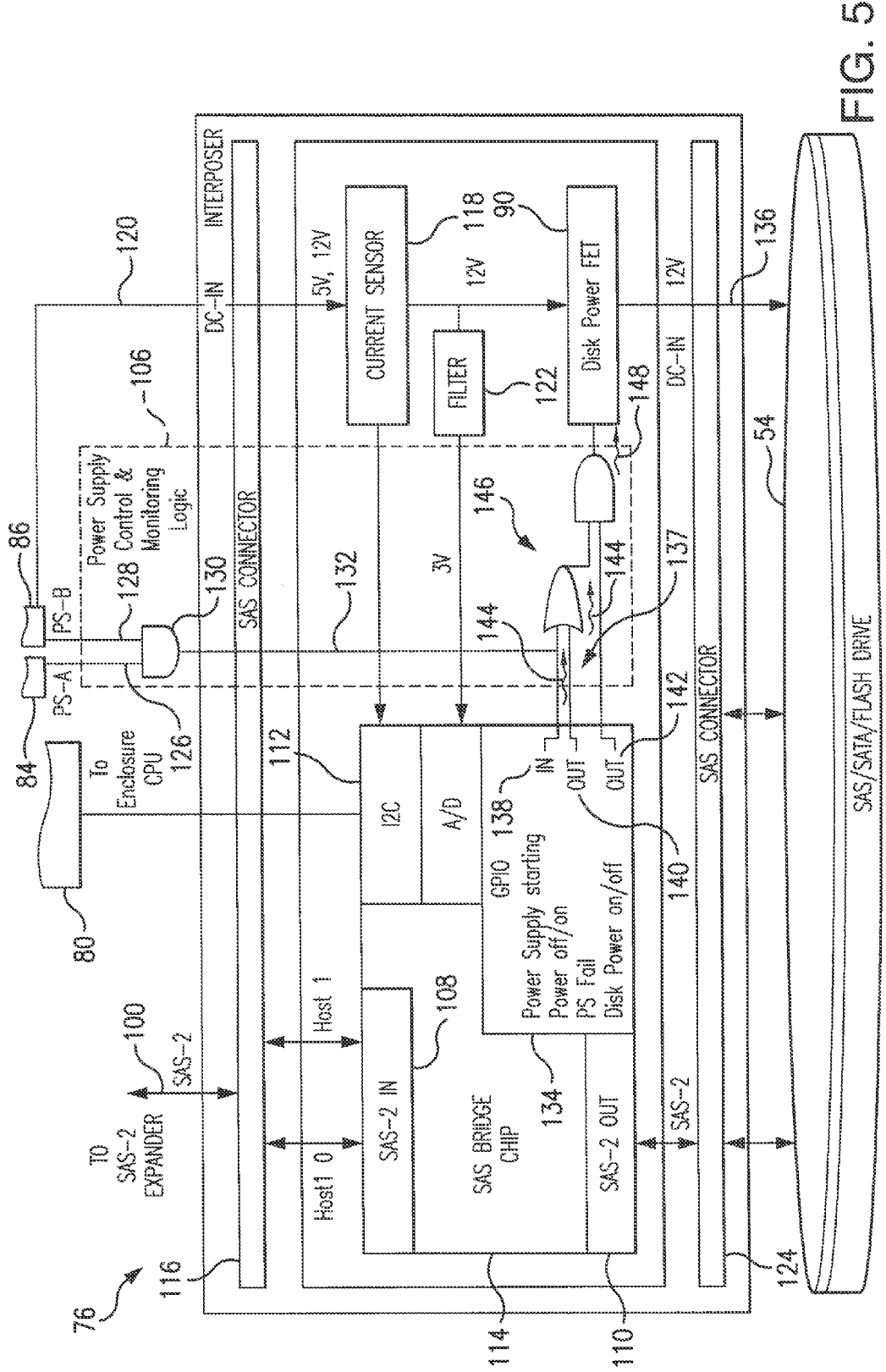
FIG. 5 is a block diagram of the interposer card connection to the drive and internal hardware details.

As will be detailed in further paragraphs in reference to FIG. 5, the interposers 76 are configured to monitor a power status line which is implemented as a logical AND of the status of all redundant power supplies in the drive enclosure. Depending on the status of all power supplies in the drive enclosure, the interposer adjusts an operational mode of the drive connected thereto by controlling a drive's power FET 90 (when needed) when the drive is idle or spinning up to perform IO transfer to decrease power consumption.

In the event of a power supply failure, the idle and spinning up drives are turned off to make sure the remaining enclosure power supplies are not overloaded. The interposer then communicates to the enclosure CPU 82 to reschedule the IO operations. This scheme allows additional drives to remain active. In case when all of the power supplies are healthy, the system supports the idle and spinning up drives which prepare for I/O activity. This mechanism allows the present system to use the redundant power supplies 84, 86 in the most efficient manner.

Typically, a drive with rotating media can pull up to 2 or 3 times its normal current when spinning up the media. The present system provides for the fact that the drive enclosure does not have to reserve the power for 3 drives to allow an extra drive to spin up, and further does not have to spin down 2 other drives before powering up an additional drive.

By allowing the use of the redundant low wattage power supplies to power up the data storage devices, the power consumption may be dramatically reduced, and an optimal load balancing and flexibility may be achieved through the efficient use of the available budgeted power supplies.

The power supply's redundant configuration in the subject system may be arranged, for example, with a main power supply 84 which may be used most efficiently to power up the drive enclosure, while the redundant power supplies 86 may be used to supply power to spin up additional drives during periods of higher host (compute nodes) activity consuming more power during certain time intervals.

The redundant power supply(s) 86 may replace the main power supply 84 if the main power supply fails during normal operations. In this situation, the redundant power supply(s) start supplying power to the drive enclosure. As an example with the drive enclosure fully populated with the drives (which has an overall power requirements of 2000 W), two 1000 W power supplies may be used with both rated to operate at 800 W during the actual (normal) load. If the load detected exceeds the threshold, then either the disk drives may be spun down, or they may be switched to a lower power mode. The redundant power supply may be used in this arrangement to spin additional drives during the periods of increased I/O activity.

If the primary power supply 84 fails, then the redundant power supply 86 assumes the entire load of the primary power supply in addition to the load it already has, so that it may temporarily be loaded upward to about 900 W. With this condition, the enclosure CPU begins prioritizing the spinning down of drives and/or putting the drives in lower power modes automatically without the interference of a system administrator.

In the case of the flash drives, when the temperature increases beyond a predefined threshold, the I/O transfers may be throttled, under the control of the enclosure CPU to regulate the power requirements of the drive in question within the budgeted limits through the interposer.

Figure 4:
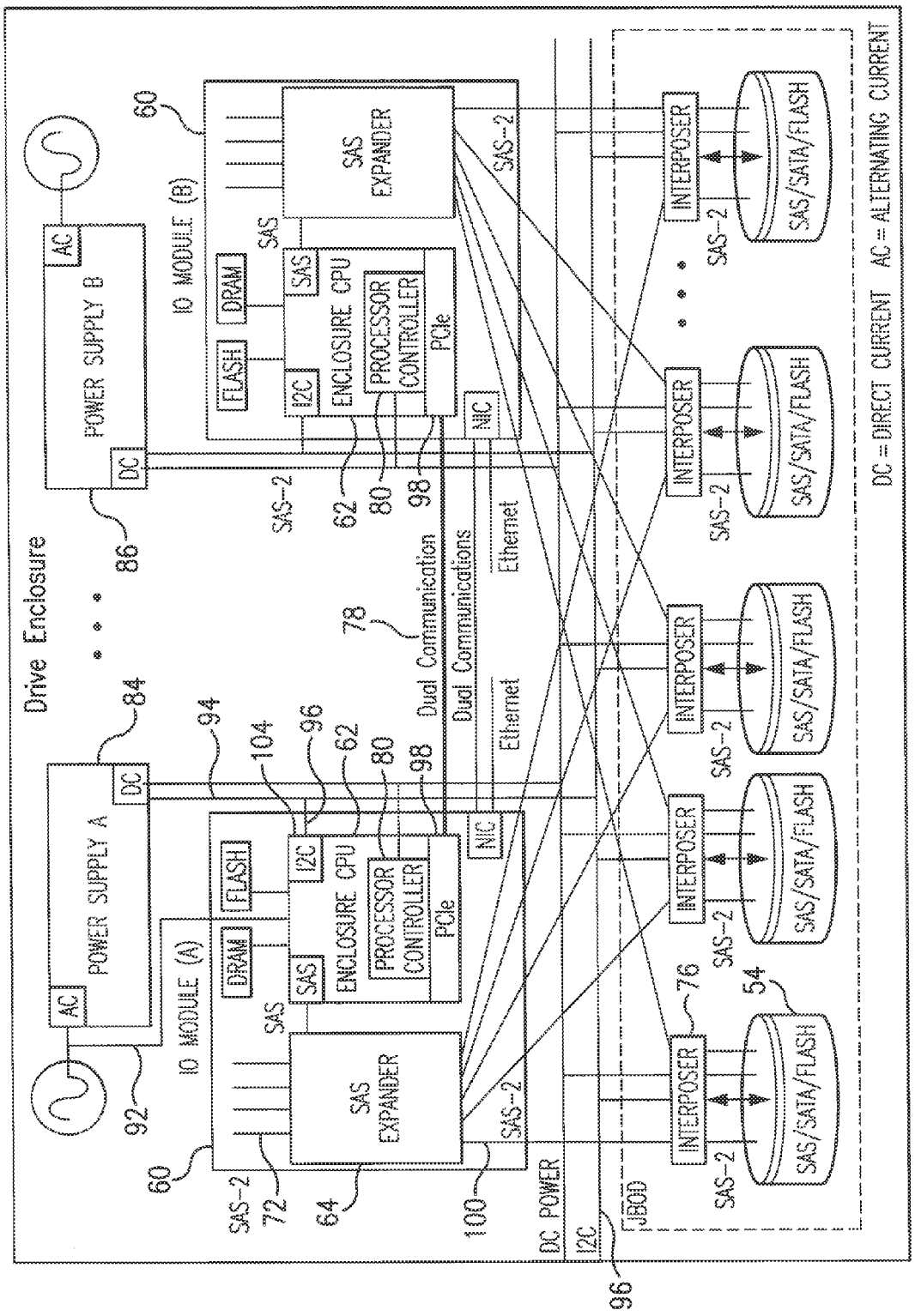
FIG. 4 is a block diagram of the data storage system of the present invention showing in detail the mechanism of power monitoring and control by the control processor unit embedded in the enclosure CPU through the interposers connected to the drives.

Referring to FIG. 4, the control processor 80, also referred to as the Power Monitoring and Control Module, monitors all the components within the drive enclosure 52 and determines the power setting of each drive 54 during the discovery process. The control processor 80 uses the I2C bus 96 to communicate with the monitoring logic 82 (shown in FIG. 3) in the power supplies 84, 86, the temperature sensors 88 and fans 89 (shown in FIG. 3) in the drive enclosure 52, the interposers 76 connected to the drives 54, as well as with each drive 54. The control processor 80 uses the power requirement profile obtained for each drive during the discovery process to regulate its power consumption and to adjust its power settings dynamically through the interposer.

The process of monitoring and controlling the power through interposers 76 in the drive enclosure 52 populated with drives 54 is detailed in further paragraphs. Each drive 54 has the interposer 76 associated therewith. The interposer 76 is configured to monitor and control the power to the drives 54 through the power FET 90.

The control processor 80 is configured to monitor the AC line voltage 92 and the DC output voltage 94 of each power supply 84, 86, as well as the other components in the system. The control processor 80 further dynamically changes the power settings in the drive enclosure 52 in accordance with real-time acquired information.

The control processor 80 uses I2C bus 96 for turning ON and OFF the power supply to the components in the drive enclosure (i.e. powering the SAS expander 64, the interposer 76, and ultimately the drives 54). The PCI express interface 98 through the dual communication channel 78 is used to coordinate and share information between the enclosure processors 80 in the IO modules 60. The SAS expander 64 is connected to a host computer (compute node) accessing the storage drive enclosure using the SAS cables 72. The SAS expander 64 is further connected to the SAS devices (for example, interposers 76) through the SAS cable 100.

The data storage system 50 supports a variety of the drives such as SAS, SATA or SSD housed within the storage drive enclosure 52. The power settings of spinning media may be adjusted to limit their power consumption. The control processor 80 updates the power settings of the drives through the interposer 76 in real time. These drives may also be manually spun up and spun down. The IO to the drive can also be throttled by the interposer to limit the power consumption of the drive.

An alternative mechanism of power setting adjustment is needed for flash drives which are also supported by the subject system. A flash drive pulls insignificant power when idle. Read operations require more power, and write operations require significantly more power compared to read operations. The control processor 80 using the NCQ (Native Command Queue) in the interposer 76 is capable of throttling the I/O operations to the flash drive of interest to reduce power consumption.

The control processor 80 programs the interposer 76 with power limits that the interposer may use while it monitors the power consumption of the flash drive in real time. In this manner the interposer can restrict the power consumption to an acceptable level by throttling the IO activity. The control processor 80 can adjust the settings of the interposers 76 dynamically as the power load of the flash drive enclosure changes.

The power supplies 84, 86 contain logic 82 (shown in FIG. 3) to monitor the AC inputs 92. If the control processor 80 detects the AC input voltage below an acceptable level, then the control processor 80 switches all of the drives into a low power mode until AC power is fully restored. If the control processor 80 detects fluctuations in the AC power then the control processor 80 switches all of the drives 54 into a low power mode for a specific time interval until the AC power stabilizes.

When detecting that the temperature in the drive enclosure 54 or a temperature of a component exceeds a predetermined level, the control processor 80 operates to increase the speed of the fans, and to switch all of the drives into a low power mode to reduce the heat generation within the drive enclosure. When detecting an excessively high temperature of a specific drive, then the control processor 80 switches the individual drive in question to a low power mode to reduce the heat generation.

The control processor 80 additionally monitors the temperature, voltage and current output of each of the power supplies in the system to determine the loading on each supply. During the system boot-up, the control processor 80 reads the maximum power information from each of the redundant powers supplies in the drive enclosure through the I2C interface 104 to determine the power load of the entire system as well as to ensure that the load does not exceed a predetermined limit.

The control processor 80 is also configured to ensure that the power load does not exceed the maximum load of the power supplies in the event of a power supply failure. Should the power load of the system exceed a predetermined limit, then the control processor 80 dynamically adjusts the power settings of the drives to reduce the power load in the system.

FIG. 5 shows the structure of the interposer 76 with internal hardware details and connection to a data storage device. The interposer 76 is configured with a logic module 106 to monitor the power consumed by the drive 54 connected to it. The control processor 80 uses this information to determine the load of each drive 54 so the load of the entire system may be accurately determined. This approach eliminates the need to profile the power usage of drives before they are used in the system.

Usually, a drive draws the largest current during spin up of its platters. The control processor 80 provides monitoring during a drive spinning up. If a drive is spinning up and a power supply fails and the control processor determines that the load on the remaining power supplies exceeds a threshold value, then the control processor 80 aborts the spin up of the drive by removing the power supply to the drive. The spinning up of the drive will then be rescheduled after the power supply to other drives is reduced.

The control processor 80 also is configured to record the temperature and power consumption of each component in the drive enclosure 52 and to report this information. This feature allows an automatic tracking of the power consumption of specific drives or sets of drives to determine the efficiency of the power supplies.

The interposer 76 includes SAS-2 connectors 108 coupled to the SAS expander and a SAS-2 connector 110 to connect to the drive 54 attachment. The SAS-2 connector 108 is dual ported and can receive the data on ports labeled Host 0 and Host 1. Through this connection power is supplied to the interposer 76.

The I2C bus 112 on the SAS bridge chip 114 connects to the control processor 80 (in the enclosure CPU) through the SAS connector 116. The power to the SAS bridge chip 114 is supplied from the on board power supplies 84, 86 through the SAS connector 116.

The current sensor 118 is used to monitor the power consumed by the interposer 76 and drive 54 via the I2C bus 112. The current sensor is coupled to the DC input of the power supplies 84, 86 to sense the DC current (voltage). The DC input voltage 120 is filtered and stepped down to the levels programmed by the control processor 80 acceptable by the SAS bridge chip 114 of the interposer 76 using the filter 122.

The FET 90 is used to control power supply to the drive 54. The switched power to the drive 54 through the SAS connector 124 is also supplied from the FET.

The logic 106 of the interposer 76 monitors power status lines 126, 128 of each redundant power supply 84, 86, respectively. A logical AND unit 130 provides a cumulative status of all power supplies in the system at the power status line 132. Depending on the status of all power supplies in the drive enclosure, the disk power FET 90 is controlled accordingly through the General Purpose Input/Output (GPIO) module 134 which is programmed to adjust power settings of the corresponding data storage drive 54 through connection 136. The GPIO module 134 is configured with control lines 137 to permit, based on the monitored status of the power status line 132 ("IN" port 138), power off/on state ("OUT" port 140), as well as drive power On/Off status ("OUT" port 142) to controllably switch the mode of operation of the drive 54 by controlling the drive power FET 90. As illustrated in FIG. 5, the GPIO module 134 outputs control signals 144 supplied via the control lines 137 to the logic 146, which processes the control signals 144 in conjunction with the status of the line 132, and generates a control signal 148 supplied to the FET 90 which, in its turn, controls power supply to the drive 54.

Figure 6:
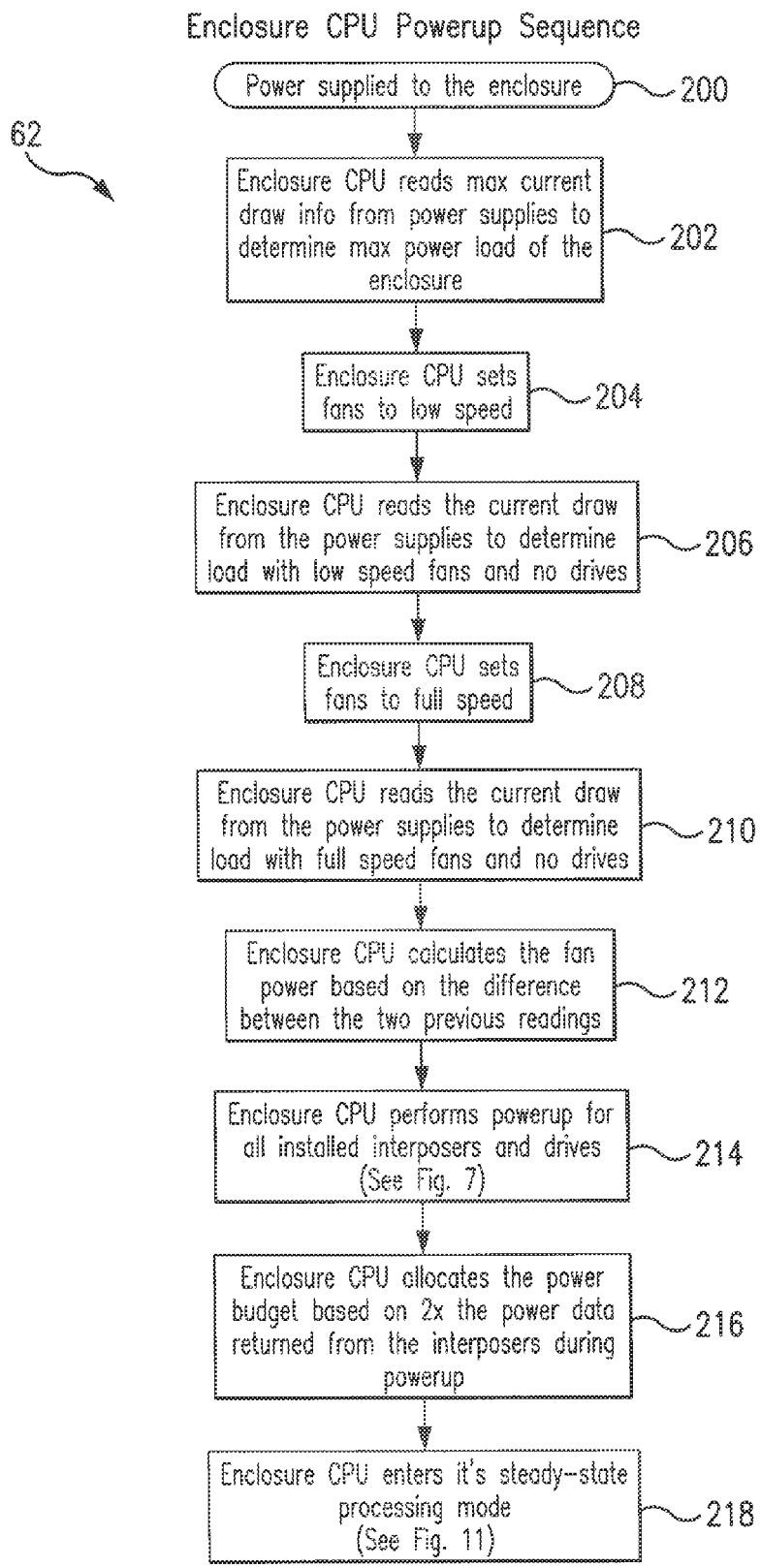
FIG. 6 is a flow chart diagram of the enclosure CPU powering up sequence of operations.

Referring to FIG. 6 representing a flow chart diagram of the sequence of operations for the enclosure CPU power up, the enclosure CPU 62 and particularly the power monitoring and control module 80 are configured to perform the following sequence of operation:

When the drive enclosure is supplied with power in step 200, the enclosure CPU reads the maximum current drawn information from power supplies to determine the maximum power load of the drive enclosure in step 202. Upon completion of the procedure in block 202, the logic flows to block 204 in which the enclosure CPU sets the fans to low speed. In block 206, the enclosure CPU reads the current draw from the power supplies to determine the load with low speed fans and no drives being activated.

Further, in block 208 the enclosure CPU sets fans to full speed. In block 210, the enclosure CPU reads the current draw from the power supplies to determine load with full speed fans and no active drives.

In further block 212, the enclosure CPU calculates the fan power based on the difference between the two previous readings, for low speed and full speed fans. In the following block 214, the enclosure CPU performs power up for all installed interposers and drives as will be detailed in FIG. 7.

Upon completion of the interposers and drives power up, the logic flows to block 216 where enclosure CPU locates the power budget based on 2× the previous power data followed by the interposer powering up the drive, discovering the drive, and recording the power usage. In block 218, the enclosure CPU enters its steady-state processing mode detailed further in FIG. 11.

Figure 7:
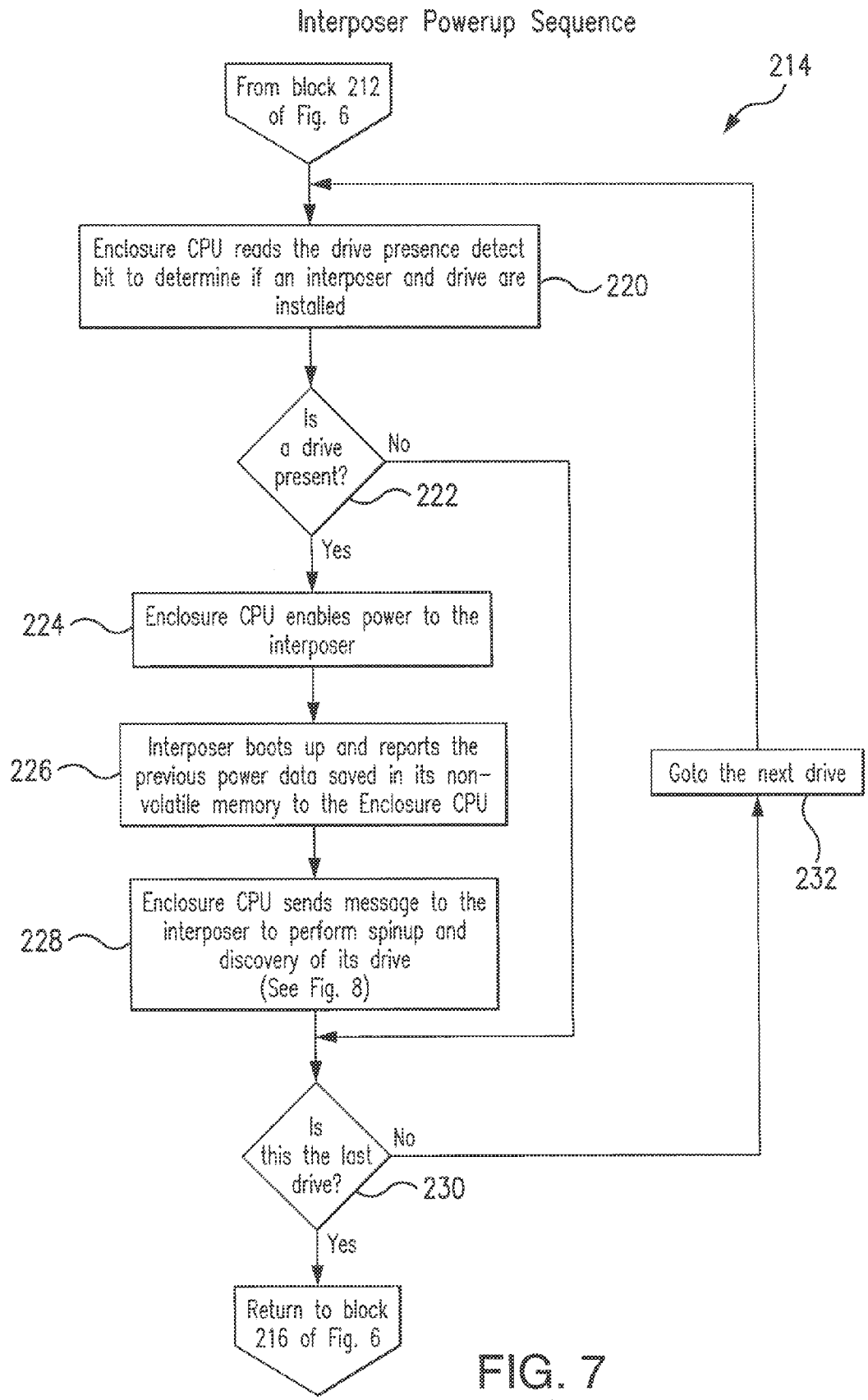
FIG. 7 is a flow chart diagram of the sequence of operations for the interposer power up.

Referring to FIG. 7 representing the sequence of operations presented in block 214 of FIG. 6 for the interposer powering up, from block 212 of FIG. 6, the logic flows to block 220 for powering up the drives one by one, and then the drives presence detect bit is read by the enclosure CPU to determine if an interposer and a drive are installed.

Further, in block 222, the logic determines if a drive is present. If the drive is present, then in block 224 the enclosure CPU enables power to the interposer. Subsequently, in block 226, the interposer boots up and reports the previous power data saved in its non-volatile memory to the enclosure CPU.

Figure 8:
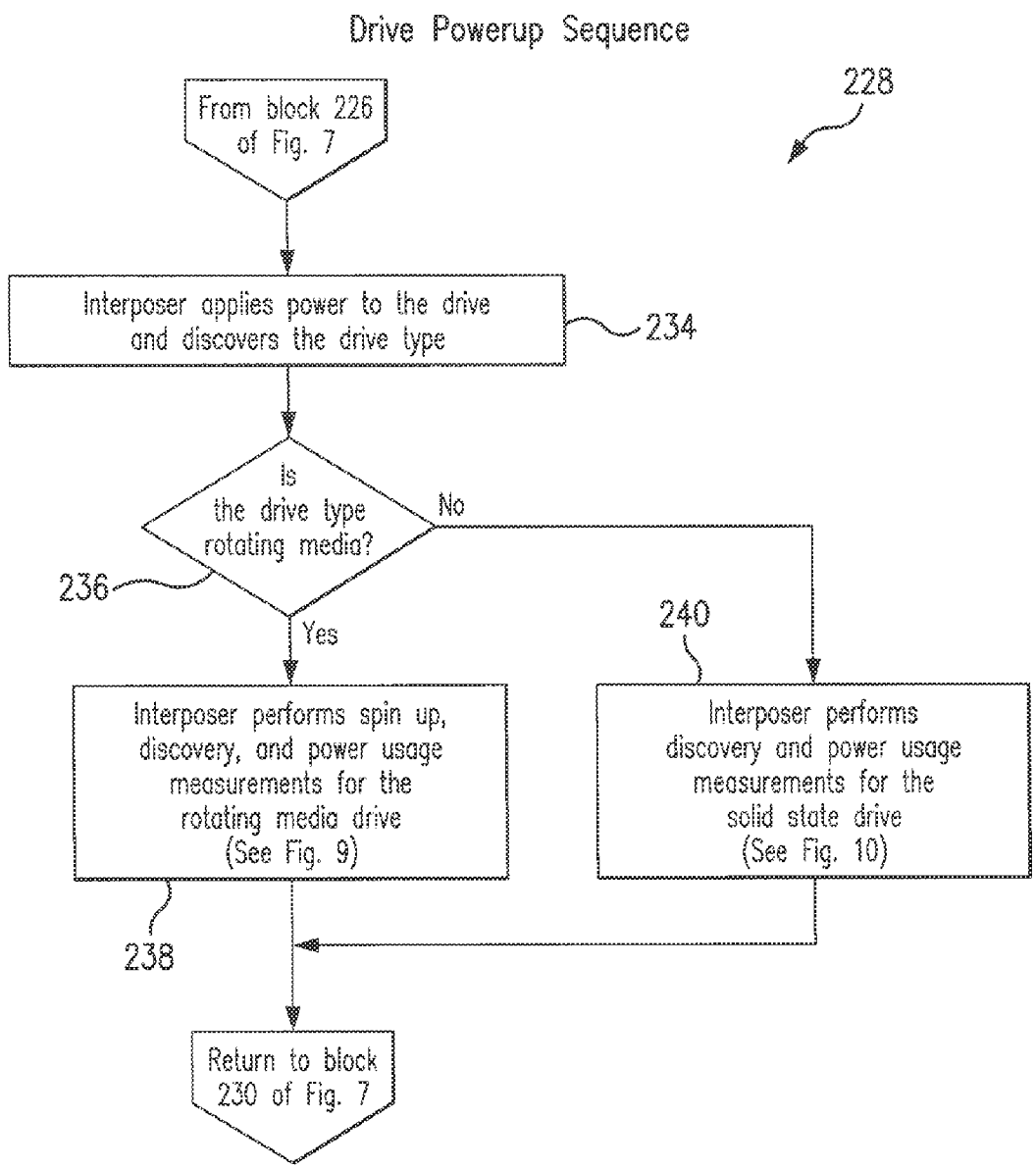
FIG. 8 is a flow chart diagram of the drive power up sequence of operations.

The enclosure CPU begins sending messages in block 228 to interposers to spin up and discover drives as will be detailed in FIG. 8.

In the further step performed in block 230, the logic determines whether the drive is the last drive. If affirmative, the logic flows to block 216 of FIG. 6. If, however, the drive in question is not the last one, the logic loops to block 220 through the block 232 "Go to the Next Drive" to perform the interposer power up routine for the next drive.

If in block 222, a drive is not present, the logic flows to block 230 to find out whether this is the last drive.

Referring to FIG. 8 which is a flow chart diagram representing the sequence of operations for the drive power up, the routine is initiated with power application to the drive in block 234. In order to discover the drive type, the logic flows to block 236 to determine whether the drive type is a rotating media. If the drive type is a rotating media, the logic flows to 238 so that the interposer can perform spin up of the drive, and discovery and power usage measurement for the rotating media drive as will be detailed further in FIG. 9.

Figure 10:
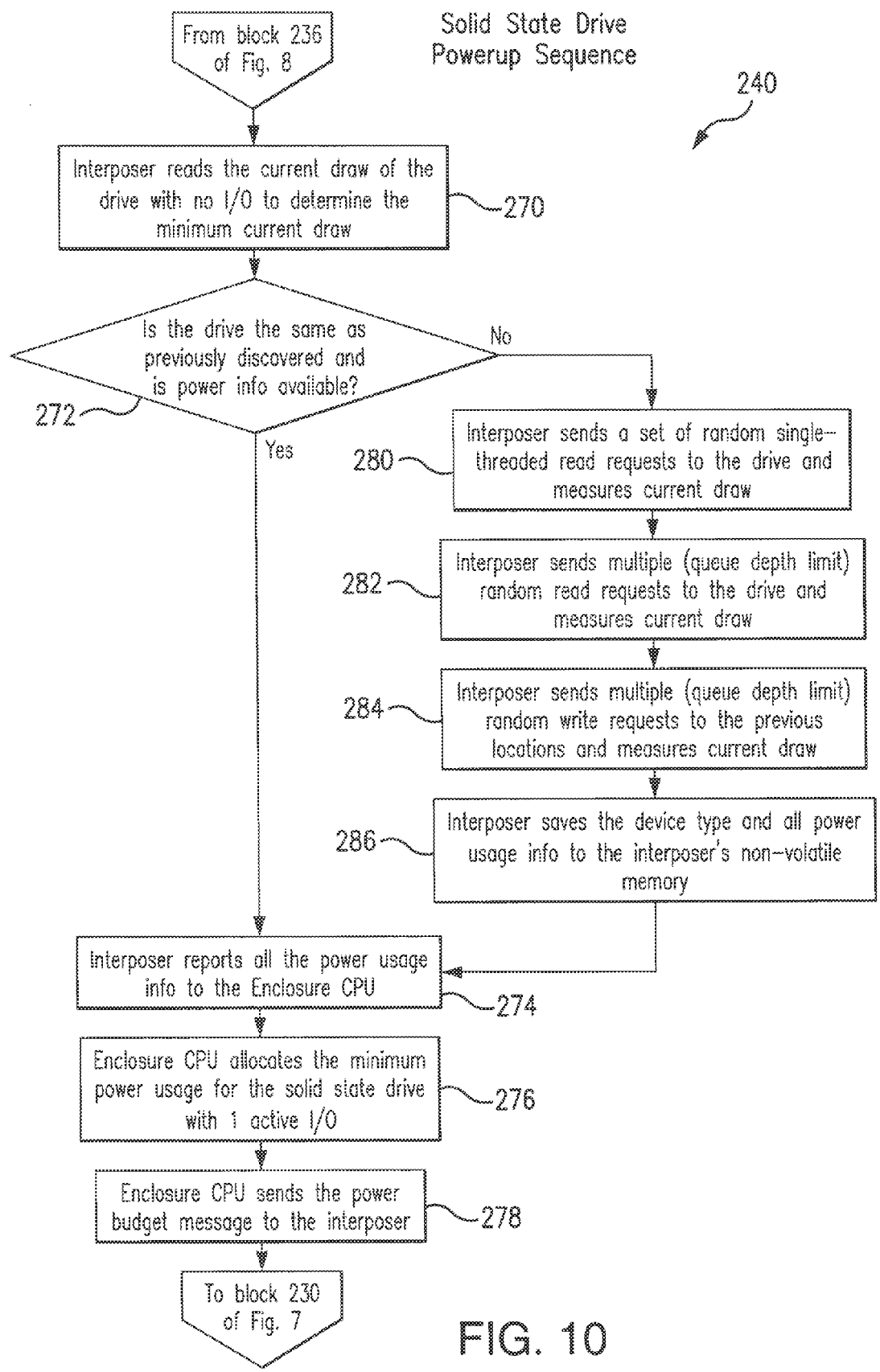
FIG. 10 is a flow chart diagram representing a solid state drive power up sequence of operations.

If in block 236, the drive media is non-rotating, the logic flows to block 240 where interposer performs discovery and power usage measurements for a solid state drive as will be detailed in further paragraphs in reference to FIG. 10.

Figure 9:
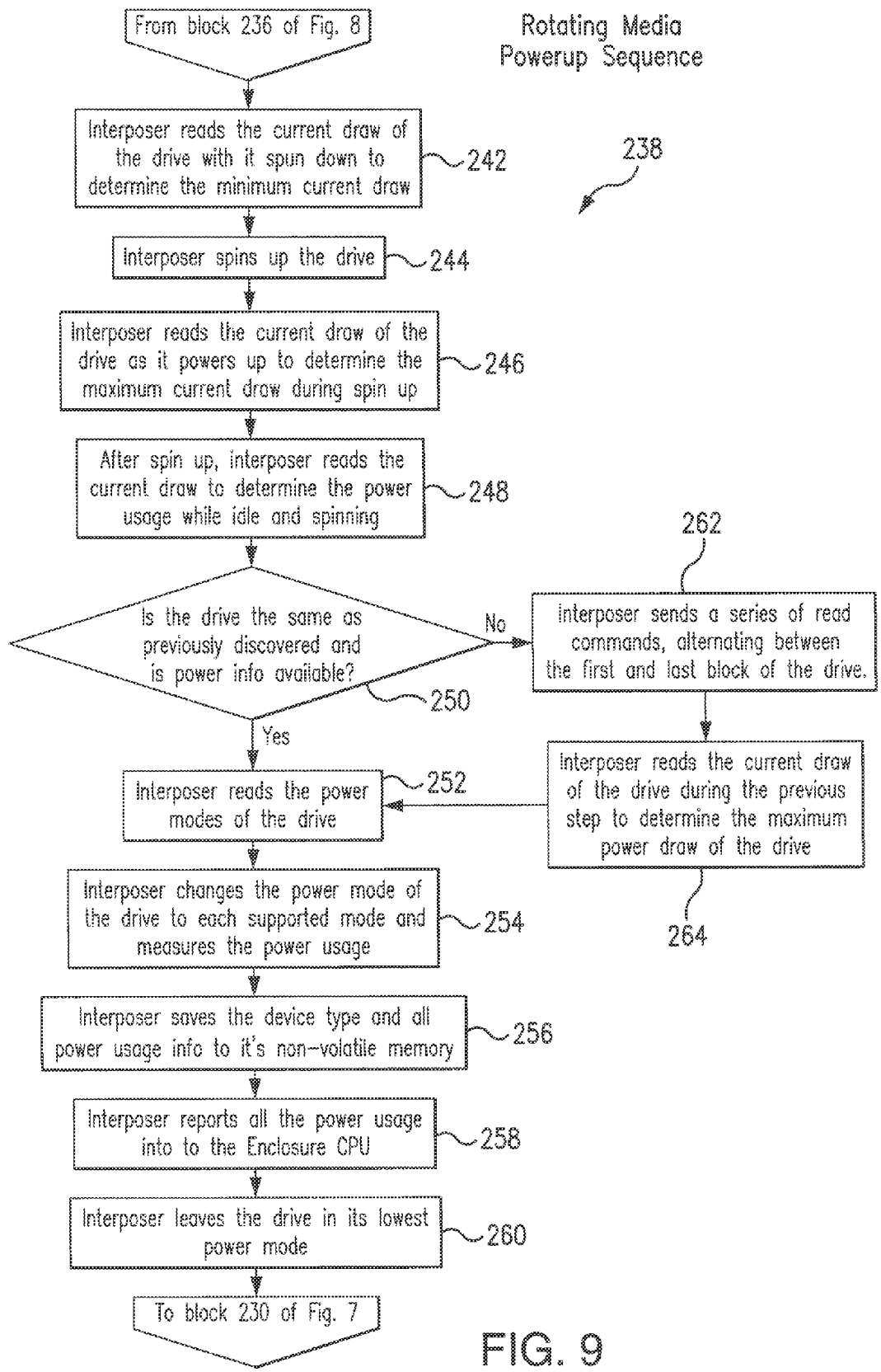
FIG. 9 is a flow chart diagram representing a rotating media power up sequence of operations.

In FIG. 9 which is a flow chart diagram representative of the sequence of operations for a powering up routine of a rotating media, when the logic determines that the storage media in question is a rotating media, the logic flows to block 242 in order that the interposer reads current draw of the drive with drive spun down to determine minimum current draw. The logic further flows to block 244 so that the interposer spins up the drive.

During the spin up operation, the interposer, in block 246, reads the current draw of the drive to determine the maximum current draw during the spin up procedure. In block 248 the interposer reads the current draw to determine the power usage while the disk is idle and spinning.

In block 250, the interposer checks if drive was the same as previously discovered and whether power information is available. If no power information is available or if the device is different, then the interposer sends a series of read commands alternating between the first and last block of the drive in block 262. In block 264 following the block 262, the interposer reads the current draw of the drive during the previous step to determine the maximum power draw of the drive at maximum power. Then the logic loops back to block 252 where the interposer reads the power modes of the drive.

If in block 250 the power information is available and the drive is the same as previously discovered, the logic flows to block 252 where the interposer reads the power modes of the drive.

From block 252, the logic follows to block 254, where the interposer changes the power mode of the drive to each power mode that the drive supports and measures the power usage. Subsequently, in block 256, the interposer saves the device type and all power usage information into its non-volatile memory, and the logic flow moves to block 258 where the interposer reports all the power usage information to the enclosure CPU. In block 260 the interposer leaves the drive in its lower power mode and waits for host IO activity.

Referring to FIG. 10 which is a flow chart diagram of the routine for a solid state drive powering up, when the logic determines that a device in question is a solid state drive, the logic flows to block 270 to allow the interposer to read current draw of the drive with no IO activity in order to determine the minimum current draw. In block 272, the interposer determines if the drive was the same as previously discovered and whether the power information is available.

If no power information is available, or if the device is different, then the logic flows to block 280, and the interposer sends a set of random single-threaded read requests to the drive and measures current draw. In block 282, the interposer sends multiple random read requests to the drive and measures the current draw. Further, in block 284, the interposer sends multiple random write requests to the previous locations and measures current draw. Further in block 286, the interposer saves the device type and all power usage information to the interposer's non-volatile memory, and the logic flows to block 274 where the interposer reports all the power usage information to the enclosure CPU.

If in block 272 the interposer determines that the drive is the same as previously discovered and the power information is available, the logic flows to block 274 where the interposer reports all of the power usage information to the enclosure CPU.

From block 274, the logic flows to block 276 where the enclosure CPU allocates a minimum power usage for the solid state drive with one active IO procedure. Further, the logic flows to block 278 where the enclosure CPU sends the power budget message to the interposer. The logic then returns to block 230 of FIG. 7.

Upon finishing the action in block 286, the interposer obtains a profile of power usage of the solid state drive, and reports this information to the enclosure CPU in block 274. The logic further flows to block 276 where the enclosure CPU allocates a minimum power usage for the solid state (flash) drive with one active IO action. Further, in block 278, the enclosure CPU sends power budget message to the interposer, and the interposer waits for the host I/O activity.

Figure 11:
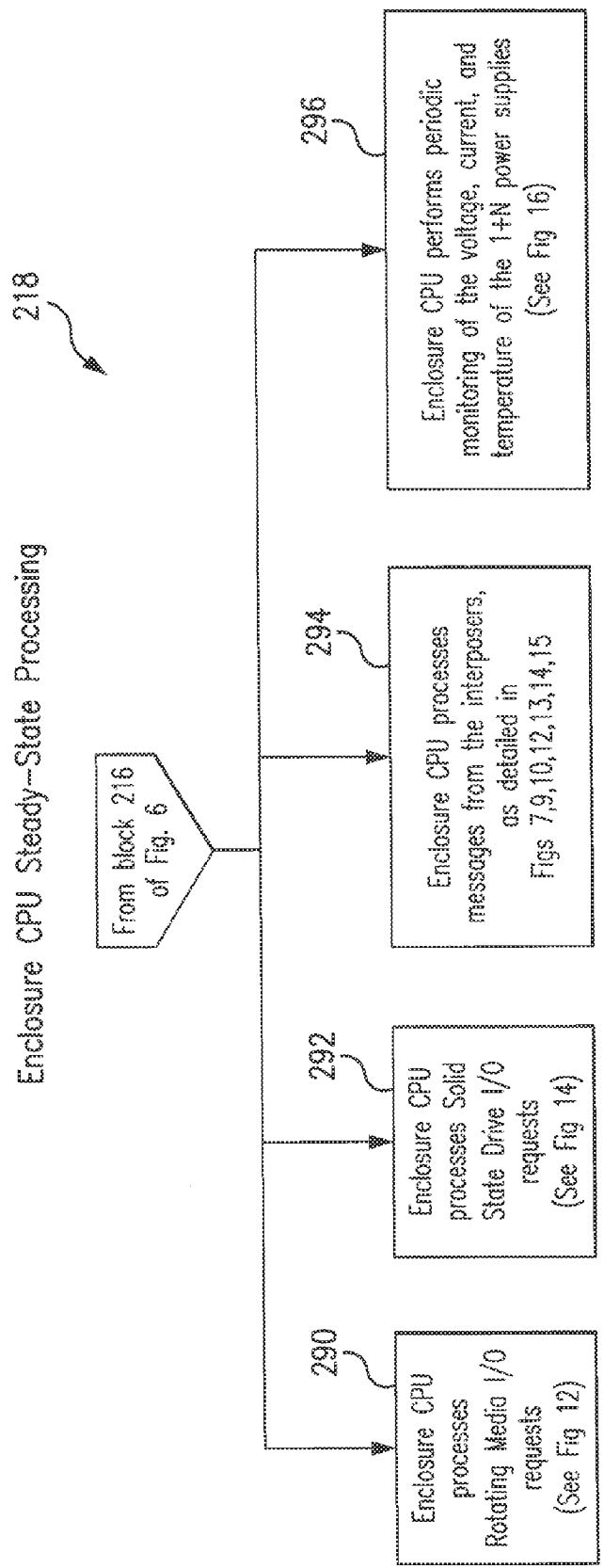
FIG. 11 is a flow chart diagram representing the enclosure CPU steady-state processing.
Figure 12:
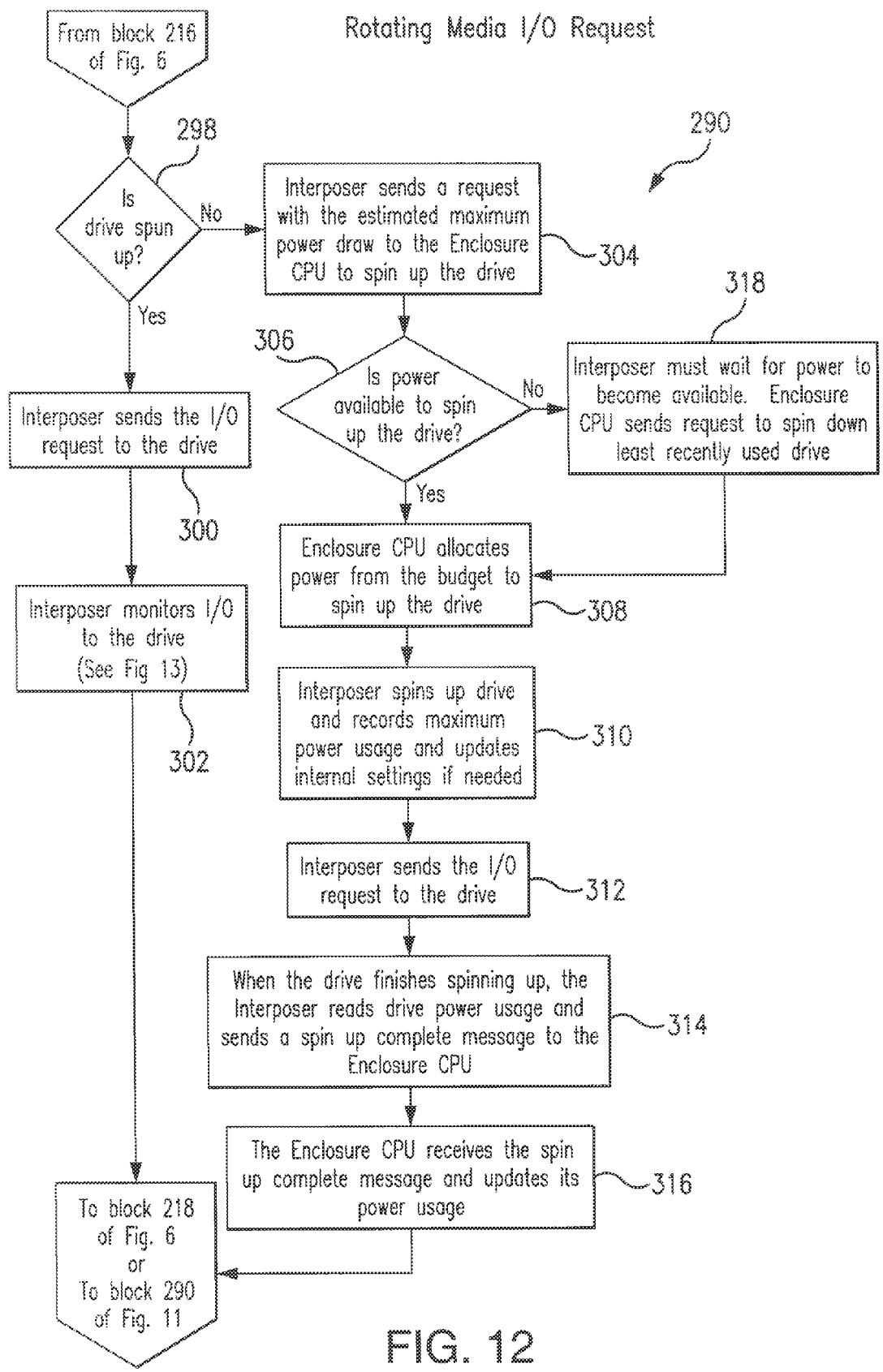
FIG. 12 is a flow chart diagram representing a routine for serving an IO request for a rotating media drive.

Referring to FIG. 11 which is a flow chart diagram representative of the enclosure CPU steady-state processing mode, in block 290 the enclosure CPU processes rotating media IO requests as will be detailed in relation to FIG. 12. In block 292 the enclosure CPU processes solid state drive IO requests as will be detailed in FIG. 14. In block 294 the enclosure CPU processes messages form the interposers as detailed in paragraphs discussing FIGS. 7, 9, 10, 12, 13, 14, and 15. In block 296, the enclosure CPU performs periodic monitoring of the voltage, current and temperature of the redundant power supplies as will be detailed in FIG. 16.

Referring to FIG. 12, which is a flow chart diagram of the routine for processing rotating media I/O request, upon receipt of the I/O request for rotating media drive, the interposer checks in block 298 as to whether the disk drive is spun up. If the disk drive is spun up, the logic flows to block 300, where the interposer sends the I/O request to the disk drive and further monitors (in block 302), the I/O activity to the disk drive as will be detailed in FIG. 14.

If in block 298, the interposer determines that the disk is spun down, the logic flows to block 304 where the interposer sends a request to spin up the disk drive to the enclosure CPU with the estimated maximum power drawn.

The logic further flows to block 306, where the interposer determines if there is enough power available to spin up the disk drive in question. If the available power is sufficient, then in block 308, the enclosure CPU allocates power from budget to spin up the disk drive. Otherwise, the logic flows to block 318, where it is determined that the disk drive must wait until power is available, and the enclosure CPU sends a request to spin down at least the most recently used disk drive.

From block 318 the logic flows to block 308 so that the enclosure CPU sends to the interposer a message granting permission to spin up the drive, so that the interposer, in block 310, spins up the disk drive and records maximum power usage, as well as updating internal settings if needed.

From block 310, the logic flows to block 312, where the interposer sends the I/O request to the disk drive.

When the disk drive finishes spinning up, the interposer, in block 314, reads the drive power usage, and sends a spin up complete message to the enclosure CPU.

In a further step, performed in block 316, the enclosure CPU receives the spin up complete message and updates power usage in the enclosure. After the I/O completion, if no more I/O requests are pending, then the interposer sends the idle message to the enclosure CPU and returns to block 218 of FIG. 6 or block 290 of FIG. 11.

Figure 13:
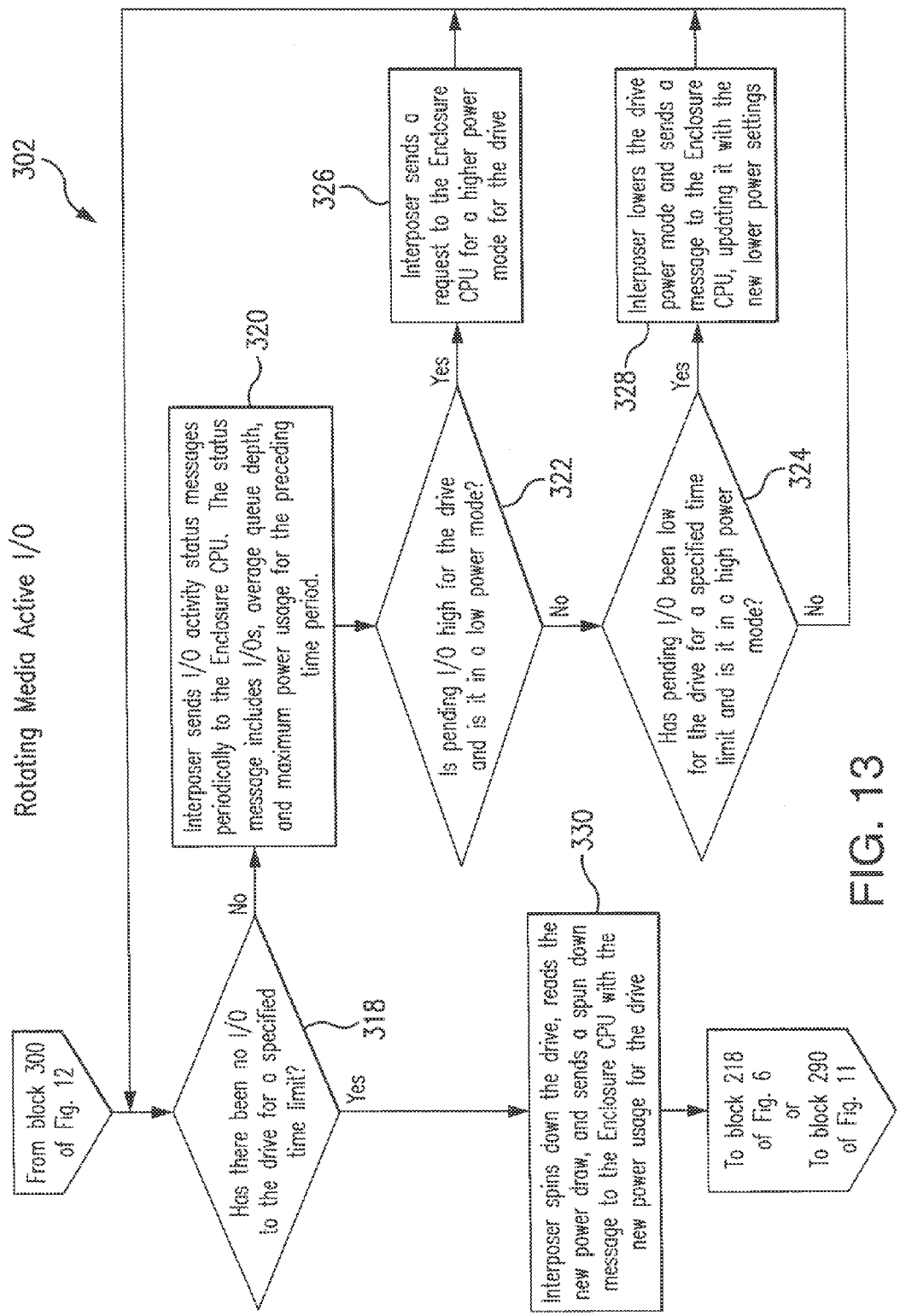
FIG. 13 is a flow chart diagram representing a sequence of operations performed by the interposer for monitoring IO activity to a rotating media drive.

Referring to FIG. 13 which is a flow chart diagram representing the routine of monitoring I/O activity to the disk drive by the interposer, the logic determines in block 318 whether there is an I/O activity to the disk drive for a specified time limit. If I/O activity is determined, i.e. with I/O on rotating media, the interposer, in block 320, begins sending I/O activity status messages periodically to the enclosure CPU. The status messages may include I/O's, average queue depth, and maximum power usage for the preceding time period.

From block 320, the logic moves to block 322, to determine if a pending I/O is high for the disk drive and whether the disk drive in question is in a low power mode. If a high number of I/O requests is pending and the disk is spinning at lower power setting, the logic flows to block 326 so that the interposer sends a request to the enclosure CPU for more power for a higher power mode.

If however, in block 322, the logic determines that the pending I/O activity is low, the logic flows to block 324 where the determination is made whether the pending I/O activity has been low for the disk drive for a specified time limit and whether the drive is in a high power mode. If a low pending I/O activity is detected and high power mode and time limit expires, the interposer lowers, in block 328, the disk drive power mode and sends the message to the enclosure CPU updating it with new lower power settings.

If in block 324 the logic determines that the disk drive is not in a high power mode, and no low I/O activity is detected for a specified time limit, the logic loops to block 318.

If in block 318, no I/O activity is detected to the disk drive for a specified time limit, the logic flows to block 330 so that the interposer powers down the disk drive, reads new power draw, and sends a spun down message to the enclosure CPU with the new power usage for the drive. Upon finishing the routine in block 330, the logic returns to block 218 of FIG. 6, or to block 290 of FIG. 11.

Figure 14:
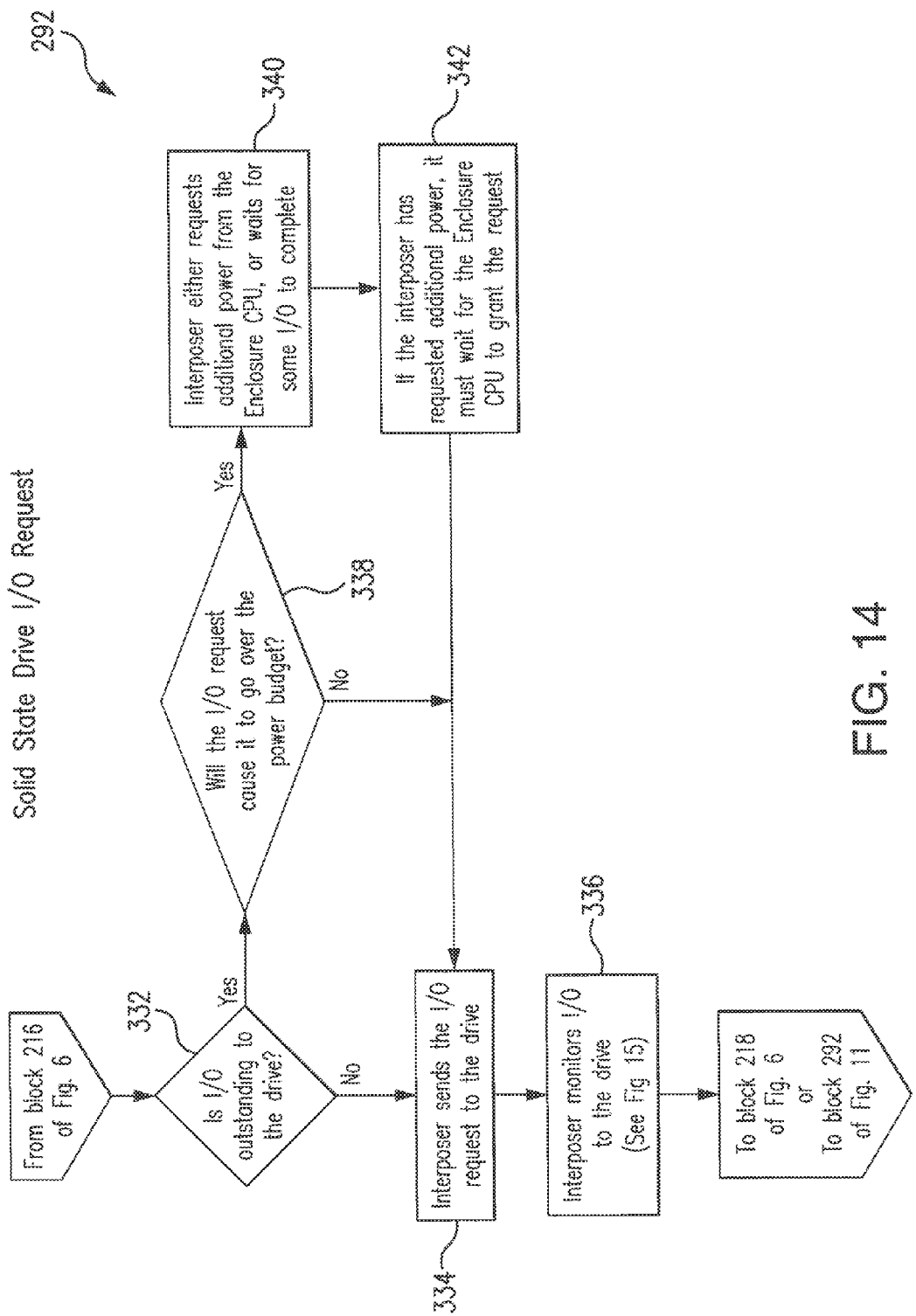
FIG. 14 is a flow chart diagram representing a routine for serving an IO request for a solid-state drive.

Referring further to FIG. 14, in the case that the solid state media receives the I/O request in block 292, then in block 332, the logic determines whether there is an I/O outstanding request to the flash drive. If no outstanding I/O request is detected, the logic flows from block 332 to block 334 and the interposer sends the I/O request to the drive.

If however in block 332, an outstanding I/O request is determined, then the logic flows to block 338 where the interposer checks the power budget to determine if servicing the I/O request will exceed the power budget. If the I/O request is not expected to exceed the power budget, the logic flows to block 334 where the interposer sends the I/O request to the flash drive.

If, however, in block 338 it is determined that the power budget may be exceeded, then the logic flows to block 340 where the interposer sends the request to the enclosure CPU for additional power or waits for I/O to be completed.

Figure 15:
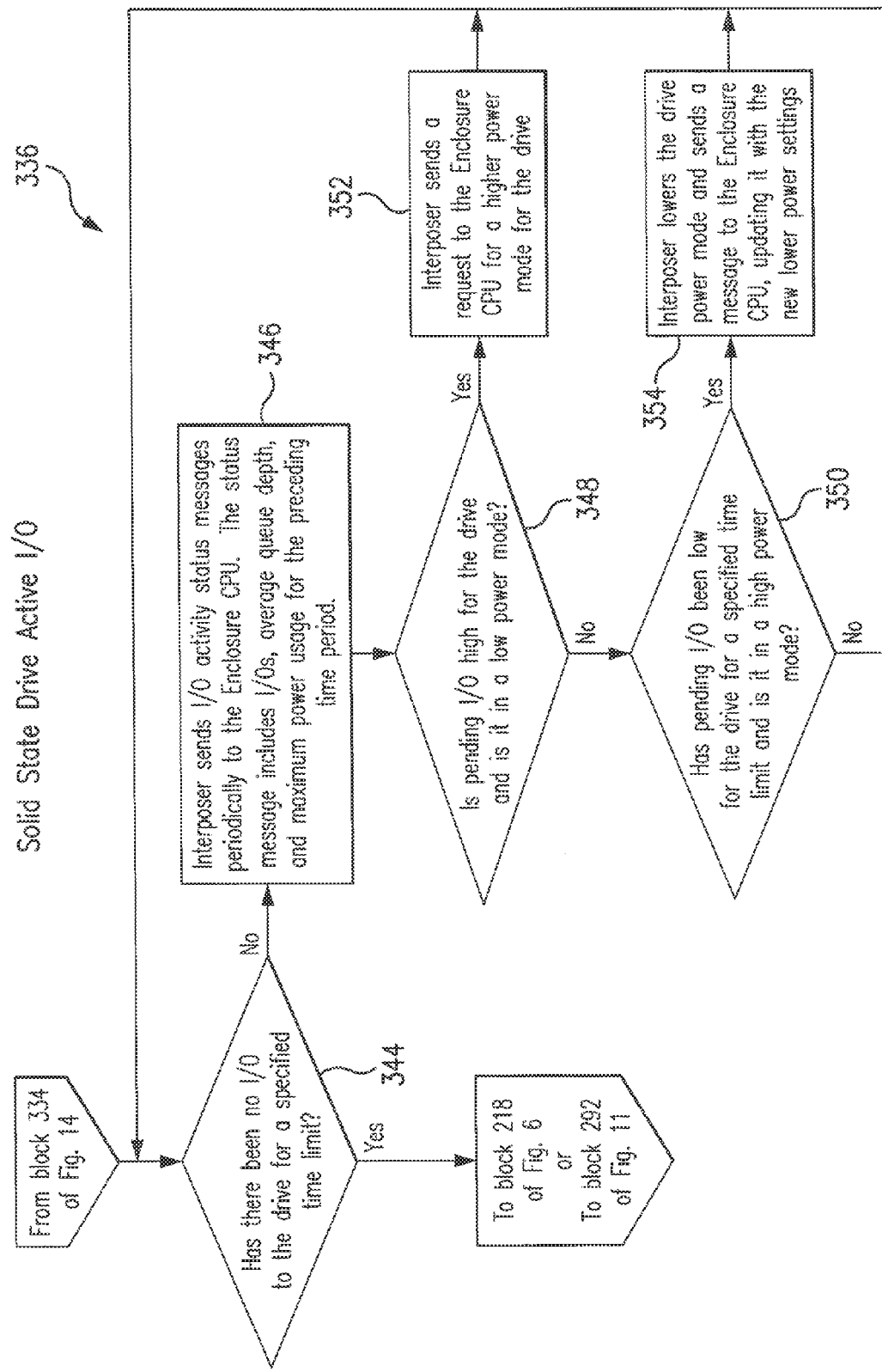
FIG. 15 is a flow chart diagram representing a sequence of operations performed by the interposers for monitoring IO activity to a solid state drive.

In block 342, when the enclosure CPU receives requests for additional power, it either grants or denies the additional power based on power usage in the system as will be presented in the discussion of FIG. 15. From block 342, the logic flows to block 334 where the interposer sends the I/O request to the drive, and further to block 336 where the interposer monitors I/O activity to the flash drive as is further detailed in FIG. 15.

Referring to FIG. 15 which is a flow chart diagram of the procedure for monitoring the solid state drive I/O activity, if in block 344, the logic detects that there has been no I/O activity to the flash drive for a specified time, the logic returns to block 218 of FIG. 6 or to block 292 of FIG. 11. If however in block 344 an I/O request is determined to the flash drive within a specified time limit, the logic moves to block 346 where the interposer begins periodically sending I/O activity status messages to the enclosure CPU. The status message may include I/O's, average queue depths, and maximum power usage over preceding time period.

Further in block 348, the logic determines whether the pending I/O request is high for the flash drive and there is a low power mode. If a number of I/O requests are pending and the flash drive operates at a lower power mode, the interposer sends a request to the enclosure CPU in block 352 for more power for a higher power mode.

If in block 348, no high I/O activity for the flash drive or low power mode are determined, the logic flows to block 350 where it is determined whether the pending I/O activity is low for the flash drive for a specified time limit and whether the flash drive in question is in a high power mode. If low I/O activity is pending, high power mode time limit expires, and the flash drive operates at high power mode, the logic flows to block 354 where the interposer lowers the drive power mode and sends a message to the enclosure CPU updating it with new lower power settings. If in block 350 no low pending I/O activity, high power mode, or specified time expiration are detected, the logic loops to block 344.

Referring again to FIG. 11, in block 294 the enclosure CPU processes messages from the interposers as detailed in previous paragraphs corresponding to FIGS. 7, 9, 10, and 12-15.

Figure 16:
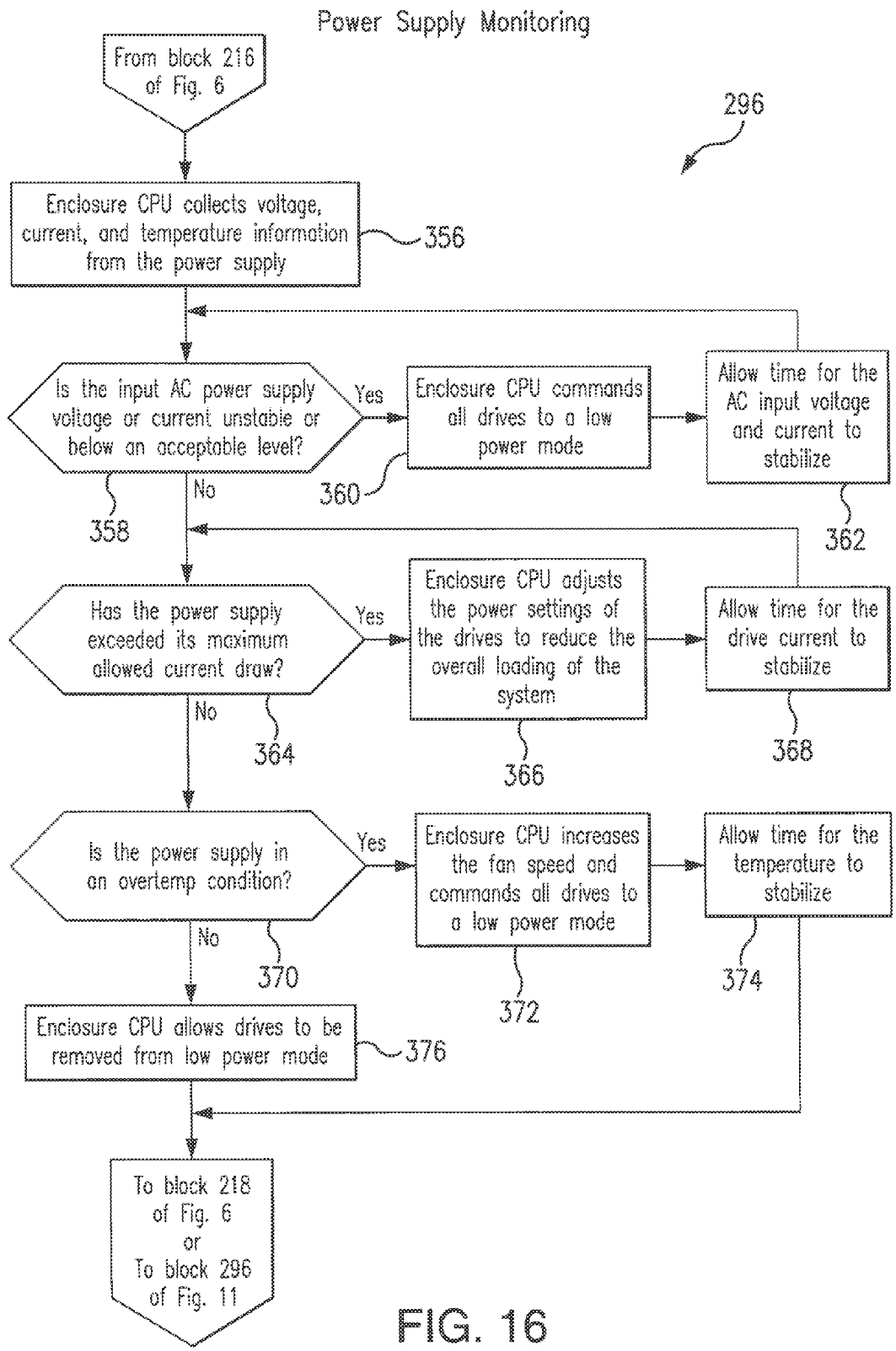
FIG. 16 is a flow chart diagram representing a sequence of operations for power supply monitoring.

The enclosure CPU performs periodic monitoring of the voltage, current and temperature of the plurality of power supplies provided within the drive enclosure. Referring to FIG. 16, in block 356, the enclosure CPU collects voltage, current and temperature information from the power supplies. The logic further flows to block 358 where the determination is made whether the input AC power supply voltage or current are unstable or below an acceptable level. If the input AC power supply voltage or current are determined to be unstable or below an acceptable level, the logic flows to block 360 where the enclosure CPU commands all flash drives to switch to a low power mode. Upon satisfying the request made in block 360, the logic flows to block 362 to allow time for the AC input voltage and current to stabilize and then loops to block 358.

If in block 358 no unstable or below an acceptable level input AC power supply voltage or current are determined, the logic flows to block 364, where the determination is made whether the power supply exceeds its maximum allowed current draw. If a power supply exceeds its maximum allowed current draw, the logic flows to block 366, where the enclosure CPU adjusts the power setting of the drives to reduce the overall loading of the system and further flows to block 368 to allow time for the drive current to stabilize. From block 368 the logic loops to block 364.

If however in logical block 364, the maximum allowed current draw for any power supply is not exceeded, the logic flows to logical block 370 where the determination is made whether the power supply is in an elevated temperature condition. If the over heat condition is detected in block 370, the logic flows to block 372 where the enclosure CPU increases the fans speed and commands all drives to a low power mode. The logic further allows time for the temperature to stabilize in block 374 and returns to block 218 of FIG. 6 or to block 296 of FIG. 11, thus finishing the routine of power supply monitoring.

If however in block 370 no elevated temperature is determined in the system, the logic flows to block 376 where the enclosure CPU permits drives to be removed from a low power mode thereby accomplishing the power supply monitoring in the system.

Although this invention has been described in connection with specific forms and embodiments thereof, it will be appreciated that various modifications other than those discussed above may be resorted to without departing from the spirit or scope of the invention as defined in the appended claims. For example, equivalent elements may be substituted for those specifically shown and described, certain features may be used independently of other features, and in certain cases, particular applications of elements may be reversed or interposed, all without departing from the spirit or scope of the invention as defined in the appended claims.

What is being claimed is:

1. A data storage system with power budget control, comprising:
    a plurality of data storage devices,
    a drive enclosure populated with said plurality of data storage devices,
    a redundantly configured power supply unit positioned in said drive enclosure, wherein said power supply unit includes a first power supply and at least a second power supply together sharing a power load of said drive enclosure and cumulatively meeting power requirements of said drive enclosure,
    at least one control processor positioned in said drive enclosure in operative connection with said plurality of data storage devices and said redundantly configured power supply unit, said at least one control processor being configured to monitor in real-time a power level available from said redundantly configured power supply unit and power load of said data storage devices, and to dynamically adjust a mode of operation of at least one of said plurality of data storage devices in accordance with data acquired through by real-time monitoring to prevent overload of said power supply unit, said at least one control processor couples a power equivalent of said first power supply to at least one data storage device if actively servicing Input-Output (IO) requests, and couples a power equivalent of said at least second power supply to a remaining portion of said plurality of data storage devices that are neither servicing IO or spinning up.

2. The data storage system of claim 1, wherein said drive enclosure further includes an IO (Input-Output) port, at least one enclosure Central Processor Unit (CPU), at least one expander operatively coupled between said IO port and said at least one enclosure CPU, and a plurality of interposers, each of said plurality of interposers being operatively coupled between said at least one expander and a respective one of said plurality of data storage devices, wherein said at least one enclosure CPU controls data IO operations in said drive enclosure for tunneling data between said IO port and said respective data storage device upon receiving an IO request from at least one compute node.

3. The data storage system of claim 2, further comprising at least one data tunneling path between said at least one compute node and said respective data storage device, said at least one data tunneling path comprising said at least one expander coupled directly to said IO port, said each interposer coupled directly to said at least one interposer, and said respective data storage device coupled directly to said each interposer.

4. The data storage system of claim 2, wherein said at least one control processor is operatively coupled between said at least one enclosure CPU and said each interposer.

5. The data storage system of claim 4, wherein said at least one control processor resides on said at least one enclosure CPU.

6. The data storage system of claim 2, wherein said each interposer is configured to monitor and control the power load of said respective data storage device.

7. The data storage system of claim 6, wherein said each interposer is coupled to each power supply in said redundantly configured power supply unit to monitor a status thereof, and to control a power supplied to said respective data storage device to avoid overload of said power supply unit.

8. The data storage systems of claim 6, wherein said at least one control processor dynamically programs said each interposer with power level available for said each interposer in real time.

9. The data storage systems of claim 1, wherein said at least one control processor is further operatively coupled to temperature sensors disposed within said drive enclosure and components within said drive enclosure to monitor, in real time, a temperature within said drive enclosure and heat level produced by at least one of said components individually, wherein said components include fans disposed within said drive enclosure, and said plurality of data storage devices, and wherein said at least one control processor adjusts a speed of said fans upon detection of temperature condition exceeding a predetermined temperature level.

10. The data storage system of claim 1, wherein said plurality of data storage devices include a data storage device selected from a group consisting of disk drives and flash drives.

11. A method for controlling power budget in a data storage system, comprising the steps of:
(a) housing a plurality of data storage devices, temperature sensors, at least one fan module, at least one Central Processor Unit (CPU), at least one expander operatively coupled to said at least one CPU, at least one interposer operatively coupled between said at least one expander and a respective one of said plurality of data storage devices in a drive enclosure,
(b) positioning a redundantly configured power supply unit in said drive enclosure, said power supply unit including a first power supply and at least a second power supply operated together to cumulatively meet power requirements for said drive enclosure operation,
(c) incorporating at least one control processor in said drive enclosure, and operatively coupling said at least one control processor to said at least one CPU, said temperature sensors, said at least one interposer, said respective data storage device, and said first and at least second power supplies,
(d) monitoring, in real time, by said at least one control processor, said temperature sensors, load of said first and at least second power supplies and load of said plurality of data storage devices, and
(e) dynamically adjusting a mode of operation of at least one of said plurality of data storage devices in correspondence with information obtained during said monitoring procedure to avoid overload of said power supply unit, responsive to an elevated temperature condition being detected, increasing said at least one fan module speed.

12. The method of claim 11, further comprising the steps of:
after said step (a), upon receiving an IO (Input-Output) request from at least one compute node, tunneling data through a path composed of said at least one expander coupled to an IO port of said drive enclosure, said at least one interposer coupled directly to said expander, and said at least one respective data storage device.

13. The method of claim 11, further comprising the steps of:
in said steps (d) and (e), if detecting an AC input voltage of at least one of said first and at least second power supplies below an acceptable voltage level, switching said plurality of data storage device into a low power mode until said AC power is fully restored, and
if detecting fluctuations in said AC power voltage, switching said plurality of data storage devices in a low power mode until said AC power stabilizes.

14. The method of claim 11, further comprising the steps of:
in said step (d), monitoring, by said at least one control processor, temperature, voltage, and current output of each of said first and at least second power supplies,
determining loading of said each power supply, and
in said step (e), dynamically adjusting power settings of said respective data storage device to reduce the load of said each power supply.

15. The method of claim 11, further comprising the steps of:
in said step (d), monitoring, by said at least one interposer, power consumed by said respective data storage device, and
determining, by said at least one control processor, a load of said respective data storage device based on said consumed power information received from said at least one interposer,
calculating, based on said load of said respective data storage device, a load in said drive enclosure, and
in said step (e), aborting spinning up of said respective data storage device if overload condition is determined in said step (d), and
rescheduling spinning up of said respective data storage device after load of other data storage devices in said plurality thereof is reduced.

16. A method for controlling power budget in a data storage system, comprising the steps of:
(a) housing a plurality of data storage devices, at least one Central Processor Unit (CPU), at least one expander operatively coupled to said at least one CPU, and at least one interposer operatively coupled between said at least one expander and a respective one of said plurality of data storage devices in a drive enclosure, said drive enclosure further housing temperature sensors and at least one fan module in said drive enclosure,
(b) positioning a redundantly configured power supply unit in said drive enclosure, said power supply unit including a first power supply and at least a second power supply cumulatively meeting power requirements for said drive enclosure operation,
(c) incorporating at least one control processor in said drive enclosure, and operatively coupling said at least one control processor to said at least one CPU, said at least one interposer, said respective data storage device, and said first and at least second power supplies, said at least one control processor being coupled to said temperature sensors, (d) monitoring, in real time, by said at least one control processor, load of said first and at least second power supplies, load of said plurality of data storage devices and said temperature sensors, and (e) dynamically adjusting a mode of operation of at least one of said plurality of data storage devices in correspondence with information obtained during said monitoring procedure to avoid overload of said power supply unit, and responsive to detection of an elevated temperature condition, adjusting, in real time, a mode of operation of at least one of said plurality of data storage device and increasing said at least one fan module speed.

17. A method for controlling power budget in a data storage system, comprising the steps of:

(a) housing a plurality of data storage devices, at least one Central Processor Unit (CPU), at least one expander operatively coupled to said at least one CPU, and at least one interposer operatively coupled between said at least one expander and a respective one of said plurality of data storage devices in a drive enclosure, (b) positioning a redundantly configured power supply unit in said drive enclosure, said power supply unit including a first power supply and at least a second power supply cumulatively meeting power requirements for said drive enclosure operation, (c) incorporating at least one control processor in said drive enclosure, and operatively coupling said at least one control processor to said at least one CPU, said at least one interposer, said respective data storage device, and said first and at least second power supplies, (d) monitoring, in real time, by said at least one control processor, load of said first and at least second power supplies and load of said plurality of data storage devices, further monitoring by said at least one interposer a power status of each of said first and at least second power supplies, and (e) dynamically adjusting a mode of operation of at least one of said plurality of data storage devices in correspondence with information obtained during said monitoring procedure to avoid overload of said power supply unit, controlling, by said interposer, power supplied to said respective data storage device through the steps of:
if said first power supply fails, turning off idle and spinning up data storage devices,
rescheduling IO activity, and
switching active of said plurality of data storage devices to said at least second power supply.

18. A method for controlling power budget in a data storage system, comprising the steps of:

(a) housing a plurality of data storage devices, at least one Central Processor Unit (CPU), at least one expander operatively coupled to said at least one CPU, and at least one interposer operatively coupled between said at least one expander and a respective one of said plurality of data storage devices in a drive enclosure, (b) positioning a redundantly configured power supply unit in said drive enclosure, said power supply unit including a first power supply and at least a second power supply cumulatively meeting power requirements for said drive enclosure operation, (c) incorporating at least one control processor in said drive enclosure, and operatively coupling said at least one control processor to said at least one CPU, said at least one interposer, said respective data storage device, and said first and at least second power supplies, (d) monitoring, in real time, by said at least one control processor, load of said first and at least second power supplies and load of said plurality of data storage devices, and dynamically programming said at least one interposer, by said at least one control processor, with an acceptable power level available for said at least one interposer, and (e) dynamically adjusting a mode of operation of at least one of said plurality of data storage devices in correspondence with information obtained during said monitoring procedure to avoid overload of said power supply unit, including throttling, by said at least one interposer, the IO activity to said respective data storage device to restrict power consumption to said acceptable power level if said respective data storage device is a solid-state drive, and spinning down said respective storage device if said respective data storage device is a rotating media drive.

19. A data storage system with power budget control, comprising:

a plurality of data storage devices, a drive enclosure populated with said plurality of data storage devices, a plurality of interposers, each operatively coupled to a respective one of said plurality of data storage devices to monitor, in real time, power consumed by said respective data storage device, a redundantly configured power supply unit positioned within said drive enclosure, said power supply unit including a first low wattage power supply and at least a second low wattage power supply together sharing a power load of said drive enclosure and cumulatively meeting power requirements of said drive enclosure, and at least one control processor positioned in said drive enclosure in operative connection with said plurality of data storage devices, said redundantly configured power supply unit, and said plurality of interposers, wherein said each interposer provides information concerning said power consumed by said respective data storage device to said at least one control processor, and wherein said at least one control processor is configured to monitor, in real time, a power level available from said redundantly configured power supply unit and power consumed by each of said respective data storage devices, and to dynamically adjust a mode of operation of at least one said respective data storage device to prevent overload in said drive enclosure, said each interposer further including a processor executable power supply and monitoring module operatively coupled to said first and at least second power supplies to monitor power status lines of each of said first and at least second power supplies, said at least one control processor being configured to process information acquired from said each interposer to determine load of said drive enclosure and to dynamically adjust mode of operation of at least one of said plurality of data storage devices accordingly.

20. The data storage system of claim 19, wherein said each interposer further includes:

a General Purpose Input/Output (GPIO) module operatively coupled to said at least one control processor and programmed to output at least one first control signal in accordance with a status of said first and at least second power supplies and a status of said respective data storage device, said processor executable power supply and monitoring module processing said at least one first control signal and cumulative power status of said first and at least one second power supplies to generate a second control signal, a logical AND unit coupled by inputs thereof to said power status lines of said first and at least second power supplies, and by output thereof to said GPIO module to supply said cumulative power status thereto, and a power FET (Field Effect Transistor) coupled between said processor executable power supply and monitoring module and said respective data storage device to control power supply to said respective data storage device in correspondence with said second control signal received from said processor executable power supply and monitoring module.

21. The data storage system of claim 19, wherein said at least one control processor dynamically programs said each interposer with power limits affordable by said each interposer, and wherein said each interposer further includes a current sensor adapted to monitor power consumed by said each interposer and said respective data storage device, said current sensor being operatively coupled to DC input of each of said first and at least second power supplies, a DC voltage sensed by said current sensor being further filtered and adjusted to said power limits.

22. The data storage system of claim 19, wherein said at least one control processor is further operatively coupled to temperature sensors disposed within said drive enclosure and components within said drive enclosure to monitor, in real time, a temperature within said drive enclosure and heat level generated by at least one of said components individually, wherein said components include fans, and said plurality of data storage devices, and wherein said at least one control processor adjusts a speed of said fans upon detection of a temperature condition exceeding a predetermined temperature level.

* * * * *

UNITED STATES PATENT AND TRADEMARK OFFICE
CERTIFICATE OF CORRECTION

| | | |
|---|---|---|
| PATENT NO. | : 8,751,836 B1 | Page 1 of 1 |
| APPLICATION NO. | : 13/338631 | |
| DATED | : June 10, 2014 | |
| INVENTOR(S) | : Michael J. Piszczek et al. | |

It is certified that error appears in the above-identified patent and that said Letters Patent is hereby corrected as shown below:

IN THE TITLE PAGE:

[73]: Delete the State designation "TX (US)" and insert the State designation --CA (US)--

Signed and Sealed this
Sixteenth Day of September, 2014

Michelle K. Lee
*Deputy Director of the United States Patent and Trademark Office*